United States Patent
Huang et al.

(10) Patent No.: US 9,647,481 B2
(45) Date of Patent: May 9, 2017

(54) APPARATUS AND METHODS FOR DOCKING A DOCKEE WITH A DOCKING HOST UTILIZING A WIRELESS CHARGER IN A WIRELESS DOCKING ENVIRONMENT

(71) Applicant: QUALCOMM Incorporated, San Diego, CA (US)

(72) Inventors: Xiaolong Huang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 996 days.

(21) Appl. No.: 13/778,057

(22) Filed: Feb. 26, 2013

(65) Prior Publication Data
US 2014/0152235 A1   Jun. 5, 2014

Related U.S. Application Data

(60) Provisional application No. 61/733,395, filed on Dec. 4, 2012.

(51) Int. Cl.
| | |
|---|---|
| *G06F 13/00* | (2006.01) |
| *H02J 7/02* | (2016.01) |
| *H04B 5/00* | (2006.01) |
| *G06F 13/40* | (2006.01) |
| *G06F 1/16* | (2006.01) |
| *H01M 10/44* | (2006.01) |
| *H02J 5/00* | (2016.01) |
| *H02J 7/00* | (2006.01) |
| *H04M 1/725* | (2006.01) |
| *H04M 1/04* | (2006.01) |

(Continued)

(52) U.S. Cl.
CPC ............ *H02J 7/025* (2013.01); *G06F 1/1632* (2013.01); *G06F 1/266* (2013.01); *G06F 13/409* (2013.01); *H01M 10/44* (2013.01); *H02J 5/005* (2013.01); *H02J 7/0044* (2013.01); *H02J 50/10* (2016.02); *H04B 5/0037* (2013.01); *H04M 1/04* (2013.01); *H04M 1/7253* (2013.01)

(58) Field of Classification Search
CPC . G06F 13/4045; G06F 1/1626; G06F 13/4081
USPC .................................................. 710/300–311
See application file for complete search history.

(56) References Cited

U.S. PATENT DOCUMENTS

| | | | |
|---|---|---|---|
| 7,242,923 | B2 | 7/2007 | Perera et al. |
| 7,378,817 | B2 | 5/2008 | Calhoon et al. |

(Continued)

OTHER PUBLICATIONS

International Search Report and Written Opinion—PCT/US2013/073158—ISA/EPO—Mar. 25, 2014.

*Primary Examiner* — Raymond Phan
(74) *Attorney, Agent, or Firm* — James Gutierrez

(57) ABSTRACT

Apparatus and methods are disclosed relating to the use and performance of a wireless charger, such as one that utilizes inductive coupling between a primary coil at the charger and a secondary coil at a mobile device that lands on the charger. In particular, the wireless charger is implemented in a wireless docking environment, where the mobile device docks with a docking host. In one example, the wireless charger is integrated as a unit with the wireless docking host. In another example, the wireless charger is a peripheral in the wireless docking environment managed by the docking host.

51 Claims, 14 Drawing Sheets

(51) Int. Cl.
  *G06F 1/26*   (2006.01)
  *H02J 50/10*  (2016.01)

(56) References Cited

U.S. PATENT DOCUMENTS

| | | | |
|---|---|---|---|
| 7,904,628 B2* | 3/2011 | Groesch | G06F 1/1632 |
| | | | 361/679.01 |
| 7,987,309 B2* | 7/2011 | Rofougaran | H04M 1/72527 |
| | | | 709/248 |
| 9,026,710 B2* | 5/2015 | Goodman | G06F 1/1632 |
| | | | 710/100 |
| 2010/0081377 A1 | 4/2010 | Chatterjee et al. | |
| 2010/0081473 A1 | 4/2010 | Chatterjee et al. | |
| 2010/0250818 A1* | 9/2010 | Gill | G06F 1/1632 |
| | | | 710/304 |
| 2011/0136550 A1 | 6/2011 | Maugars | |
| 2012/0206097 A1 | 8/2012 | Soar | |
| 2014/0059263 A1* | 2/2014 | Rosenberg | G06F 13/00 |
| | | | 710/303 |
| 2014/0330998 A1* | 11/2014 | Dees | H04M 1/72527 |
| | | | 710/303 |

* cited by examiner

APPARATUS AND METHODS FOR DOCKING A DOCKEE WITH A DOCKING HOST UTILIZING A WIRELESS CHARGER IN A WIRELESS DOCKING ENVIRONMENT

CROSS-REFERENCE TO RELATED APPLICATIONS

This application claims priority to and the benefit of provisional patent application No. 61/733,395, titled, "Apparatus and Methods for Utilizing a Wireless Charger in a Wireless Docking Environment" and filed in the United States Patent and Trademark Office on Dec. 4, 2012, the entire content of which is incorporated herein by reference.

TECHNICAL FIELD

Aspects of the present disclosure relate generally to wireless docking systems, and more particularly, to apparatus and methods for utilizing a wireless charger in a wireless docking environment.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recent interest has been directed toward WLAN connectivity, and in particular, to wireless docking systems. A wireless docking system can provide seamless connectivity between a portable device ("dockee") such as a mobile handset, PDA, tablet computer, etc., and a group of peripheral devices, by way of a docking host. That is, the docking host can intermediate between the dockee and the peripherals. Here, peripheral devices can be any of numerous types, such as a mouse, keyboard, display, printer, camera, speakers, mass storage devices, media servers, sensors, and many others.

Meanwhile, wireless chargers are known in the art, and provide the capability to charge battery-powered devices without any physical attachment or plug between the battery-powered device and the wireless charger. For example, inductive charging may be utilized, wherein energy is transferred from the wireless charger to the battery-powered device by way of inductive coupling between respective coils at each device. In the literature, such devices might additionally be referred to as contactless energy transfer devices.

As the demand for mobile broadband access continues to increase, research and development continue to advance wireless technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide apparatus and methods of operating a wireless docking environment that includes a wireless charger.

For example, in one aspect, the disclosure provides a method operable at a docking host for docking a dockee with a docking environment managed by the docking host. Here, the method includes the steps of transmitting credential information from the docking host to the dockee responsive to a landing of the dockee on a wireless charger, receiving a request from the dockee to initiate an authentication/association operation with the dockee, and docking the dockee with the docking environment in accordance with the credential information.

In another aspect, the disclosure provides a method operable at a dockee for docking with a docking environment managed by a docking host. Here, the method includes the steps of receiving credential information from the docking host responsive to a landing of the dockee on a wireless charger, transmitting a request to initiate an authentication/association operation with the docking host, and docking with the docking environment in accordance with the credential information.

In another aspect, the disclosure provides a method operable at a docking host for docking a dockee with a docking environment managed by the docking host. Here, the method includes the steps of coupling wireless charging circuitry at the docking host with the dockee upon its landing on the docking host, transmitting, from the wireless charging circuitry at the docking host, to docking circuitry at the wireless docking host, information indicating a docking intent of the dockee, and docking the dockee with the docking environment in accordance with the docking intent of the dockee.

In another aspect, the disclosure provides a method operable at a dockee for docking with a docking environment managed by a docking host. Here, the method includes the steps of landing on the docking host, wherein the docking host comprises wireless charging circuitry, and docking with the docking environment in accordance with a docking intent of the dockee, wherein the docking intent is signaled to the docking host by the landing on the docking host.

In another aspect, the disclosure provides a method operable at a dockee for docking with a docking environment managed by a docking host. Here, the method includes the steps of landing on a wireless charger to establish a coupling with the wireless charger utilizing a wireless charging interface at the dockee, transmitting credential information to the docking host in response to the landing on the wireless charger, over a wireless docking host interface at the dockee, and docking with the docking environment in accordance with the credential information, wherein the docking environment comprises the wireless charger as a peripheral.

In another aspect, the disclosure provides a method operable at a docking host for enabling a peripheral comprising a wireless charger to wirelessly charge a dockee. Here, the method includes the steps of establishing a docking session with the dockee utilizing a wireless dockee interface at the docking host, receiving information from the wireless charger indicating that the dockee landed on the wireless charger, and transmitting an authorization to the wireless charger indicating that a wireless charging function is authorized.

In another aspect, the disclosure provides a method operable at a wireless charger for wirelessly charging a mobile device. Here, the method includes the steps of pairing with a docking host, such that the wireless charger is a peripheral in a docking environment managed by the docking host, determining that the mobile device has landed on the wireless charger, requesting from the docking host authorization to wirelessly charge the mobile device, receiving the authorization from the docking host, and enabling a wireless charging function for charging the mobile device.

In another aspect, the disclosure provides a docking host configured for docking a dockee with a docking environment managed by the docking host. Here, the docking host includes at least one processor, a memory communicatively coupled to the at least one processor, wireless charging circuitry communicatively coupled to the at least one processor for wirelessly charging the dockee, and a wireless dockee interface communicatively coupled to the at least one processor for communicating with the dockee utilizing one of a Bluetooth Low Energy (BTLE) protocol or a Wi-Fi protocol. The at least one processor is configured to transmit credential information to the dockee responsive to a landing of the dockee on a wireless charger, to receive a request from the dockee to initiate an authentication/association operation with the dockee, and to dock the dockee with the docking environment in accordance with the credential information.

In another aspect, the disclosure provides a dockee configured for docking with a docking environment managed by a docking host. Here, the dockee includes at least one processor, a memory communicatively coupled to the at least one processor, wireless charging circuitry communicatively coupled to the at least one processor for wirelessly charging the dockee, and a communication interface communicatively coupled to the at least one processor for communicating with the docking host utilizing one of a Bluetooth Low Energy (BTLE) protocol or a Wi-Fi protocol. The at least one processor is configured to receive credential information from the docking host responsive to a landing of the dockee on a wireless charger, to transmit a request to initiate an authentication/association operation with the docking host, and to dock with the docking environment in accordance with the credential information.

In another aspect, the disclosure provides a docking host configured for docking a dockee with a docking environment managed by the docking host. Here, the docking host includes at least one processor, a memory communicatively coupled to the at least one processor, wireless charging circuitry communicatively coupled to the at least one processor for wirelessly charging the dockee, and a wireless dockee interface communicatively coupled to the at least one processor for communicating with the dockee utilizing one of a Bluetooth Low Energy (BTLE) protocol or a Wi-Fi protocol. The at least one processor is configured to couple the wireless charging circuitry with the dockee upon its landing on the docking host, to determine a docking intent of the dockee corresponding to the coupling of the wireless charging circuitry with the dockee, and to dock the dockee with the docking environment in accordance with the docking intent of the dockee.

In another aspect, the disclosure provides a dockee configured for docking with a docking environment managed by a docking host. Here, the dockee includes at least one processor, a memory communicatively coupled to the at least one processor, wireless charging circuitry communicatively coupled to the at least one processor for wirelessly charging the dockee, and a communication interface communicatively coupled to the at least one processor for communicating with the docking host utilizing one of a Bluetooth Low Energy (BTLE) protocol or a Wi-Fi protocol. The at least one processor is configured to land on the docking host, wherein the docking host comprises wireless charging circuitry, and to dock with the docking environment in accordance with a docking intent of the dockee, wherein the docking intent is signaled to the docking host by the landing on the docking host.

In another aspect, the disclosure provides a dockee configured for docking with a docking environment managed by a docking host. Here, the dockee includes at least one processor, a memory communicatively coupled to the at least one processor, wireless charging circuitry communicatively coupled to the at least one processor for wirelessly charging the dockee, and a communication interface communicatively coupled to the at least one processor for communicating with the docking host utilizing one of a Bluetooth Low Energy (BTLE) protocol or a Wi-Fi protocol. The at least one processor is configured to land on a wireless charger to establish a coupling with the wireless charger utilizing a wireless charging interface at the dockee, to transmit credential information to the docking host in response to the landing on the wireless charger, over a wireless docking host interface at the dockee, and to dock with the docking environment in accordance with the credential information, wherein the docking environment comprises the wireless charger as a peripheral.

In another aspect, the disclosure provides a docking host configured for enabling a peripheral comprising a wireless charger to wirelessly charge a dockee. Here, the docking host includes at least one processor, a memory communicatively coupled to the at least one processor, a communication interface communicatively coupled to the at least one processor for communicating with the wireless charger utilizing one of a Bluetooth Low Energy (BTLE) protocol or a Wi-Fi protocol. The at least one processor is configured to establish a docking session with the dockee, to receive information from the wireless charger indicating that the dockee landed on the wireless charger, and to transmit an authorization to the wireless charger indicating that a wireless charging function is authorized.

In another aspect, the disclosure provides a wireless charger configured for wirelessly charging a mobile device. Here, the wireless charger includes at least one processor, a memory communicatively coupled to the at least one processor, a communication interface communicatively coupled to the at least one processor for wirelessly communicating with a docking host, and wireless charging circuitry communicatively coupled to the at least one processor for wirelessly charging the mobile device. The at least one processor is configured to pair with the docking host, such that the wireless charger is a peripheral in a docking environment managed by the docking host, to determine that the mobile device has landed on the wireless charger, to request from the docking host authorization to wirelessly charge the mobile device, to receive the authorization from the docking host, and to enable a wireless charging function for charging the mobile device.

In another aspect, the disclosure provides a docking host configured for docking a dockee with a docking environment managed by the docking host, including means for transmitting credential information from the docking host to the dockee responsive to a landing of the dockee on a wireless charger, means for receiving a request from the dockee to initiate an authentication/association operation with the dockee, and means for docking the dockee with the docking environment in accordance with the credential information.

In another aspect, the disclosure provides a dockee configured for docking with a docking environment managed by a docking host, including means for receiving credential information from the docking host responsive to a landing of the dockee on a wireless charger, means for transmitting a request to initiate an authentication/association operation with the docking host; and means for docking with the docking environment in accordance with the credential information.

In another aspect, the disclosure provides a docking host configured for docking a dockee with a docking environment managed by the docking host, including means for coupling wireless charging circuitry at the docking host with the dockee upon its landing on the docking host, means for transmitting to the wireless docking host information indicating a docking intent of the dockee, and means for docking the dockee with the docking environment in accordance with the docking intent of the dockee.

In another aspect, the disclosure provides a dockee configured for docking with a docking environment managed by a docking host, including means for landing on the docking host, wherein the docking host comprises wireless charging circuitry, and means for docking with the docking environment in accordance with a docking intent of the dockee, wherein the docking intent is signaled to the docking host by the landing on the docking host.

In another aspect, the disclosure provides a dockee configured for docking with a docking environment managed by a docking host, including means for landing on a wireless charger to establish a coupling with the wireless charger utilizing a wireless charging interface at the dockee, means for transmitting credential information to the docking host in response to the landing on the wireless charger, over a wireless docking host interface at the dockee, and means for docking with the docking environment in accordance with the credential information, wherein the docking environment comprises the wireless charger as a peripheral.

In another aspect, the disclosure provides a docking host configured for enabling a peripheral comprising a wireless charger to wirelessly charge a dockee, including means for establishing a docking session with the dockee utilizing a wireless dockee interface at the docking host, means for receiving information from the wireless charger indicating that the dockee landed on the wireless charger, and means for transmitting an authorization to the wireless charger indicating that a wireless charging function is authorized.

In another aspect, the disclosure provides a wireless charger configured for wirelessly charging a mobile device, including means for pairing with a docking host, such that the wireless charger is a peripheral in a docking environment managed by the docking host, means for determining that the mobile device has landed on the wireless charger, means for requesting from the docking host authorization to wirelessly charge the mobile device, means for receiving the authorization from the docking host, and means for enabling a wireless charging function for charging the mobile device.

In another aspect, the disclosure provides a computer-readable storage medium operable at a docking host configured for docking a dockee with a docking environment managed by the docking host, including instructions for causing a computer to transmit credential information from the docking host to the dockee responsive to a landing of the dockee on a wireless charger, instructions for causing a computer to receive a request from the dockee to initiate an authentication/association operation with the dockee, and instructions for causing a computer to dock the dockee with the docking environment in accordance with the credential information.

In another aspect, the disclosure provides a computer-readable storage medium operable at a dockee configured for docking with a docking environment managed by a docking host, including instructions for causing a computer to receive credential information from the docking host responsive to a landing of the dockee on a wireless charger, instructions for causing a computer to transmit a request to initiate an authentication/association operation with the docking host, and instructions for causing a computer to dock with the docking environment in accordance with the credential information.

In another aspect, the disclosure provides a computer-readable storage medium operable at a docking host configured for docking a dockee with a docking environment managed by the docking host, including instructions for causing a computer to couple wireless charging circuitry at the docking host with the dockee upon its landing on the docking host, instructions for causing a computer to transmit to the wireless docking host information indicating a docking intent of the dockee, and instructions for causing a computer to dock the dockee with the docking environment in accordance with the docking intent of the dockee.

In another aspect, the disclosure provides a computer-readable storage medium operable at a dockee configured for docking with a docking environment managed by a docking host, including instructions for causing a computer to dock with the docking environment in accordance with a docking intent of the dockee, wherein the docking intent is signaled to the docking host by the dockee landing on the docking host.

In another aspect, the disclosure provides a computer-readable storage medium operable at a dockee configured for docking with a docking environment managed by a docking host, including instructions for causing a computer to land on a wireless charger to establish a coupling with the wireless charger utilizing a wireless charging interface at the dockee, instructions for causing a computer to transmit credential information to the docking host in response to the landing on the wireless charger, over a wireless docking host interface at the dockee, and instructions for causing a computer to dock with the docking environment in accordance with the credential information, wherein the docking environment comprises the wireless charger as a peripheral.

In another aspect, the disclosure provides a computer-readable storage medium operable at a docking host configured for enabling a peripheral comprising a wireless charger to wirelessly charge a dockee, including instructions for causing a computer to establish a docking session with the dockee utilizing a wireless dockee interface at the docking host, instructions for causing a computer to receive information from the wireless charger indicating that the dockee landed on the wireless charger, and instructions for causing a computer to transmit an authorization to the wireless charger indicating that a wireless charging function is authorized.

In another aspect, the disclosure provides a computer-readable storage medium operable at a wireless charger configured for wirelessly charging a mobile device, including instructions for causing a computer to pair with a docking host, such that the wireless charger is a peripheral in a docking environment managed by the docking host, instructions for causing a computer to determine that the mobile device has landed on the wireless charger, instructions for causing a computer to request from the docking host authorization to wirelessly charge the mobile device, instructions for causing a computer to receive the authorization from the docking host, and instructions for causing a computer to enable a wireless charging function for charging the mobile device.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
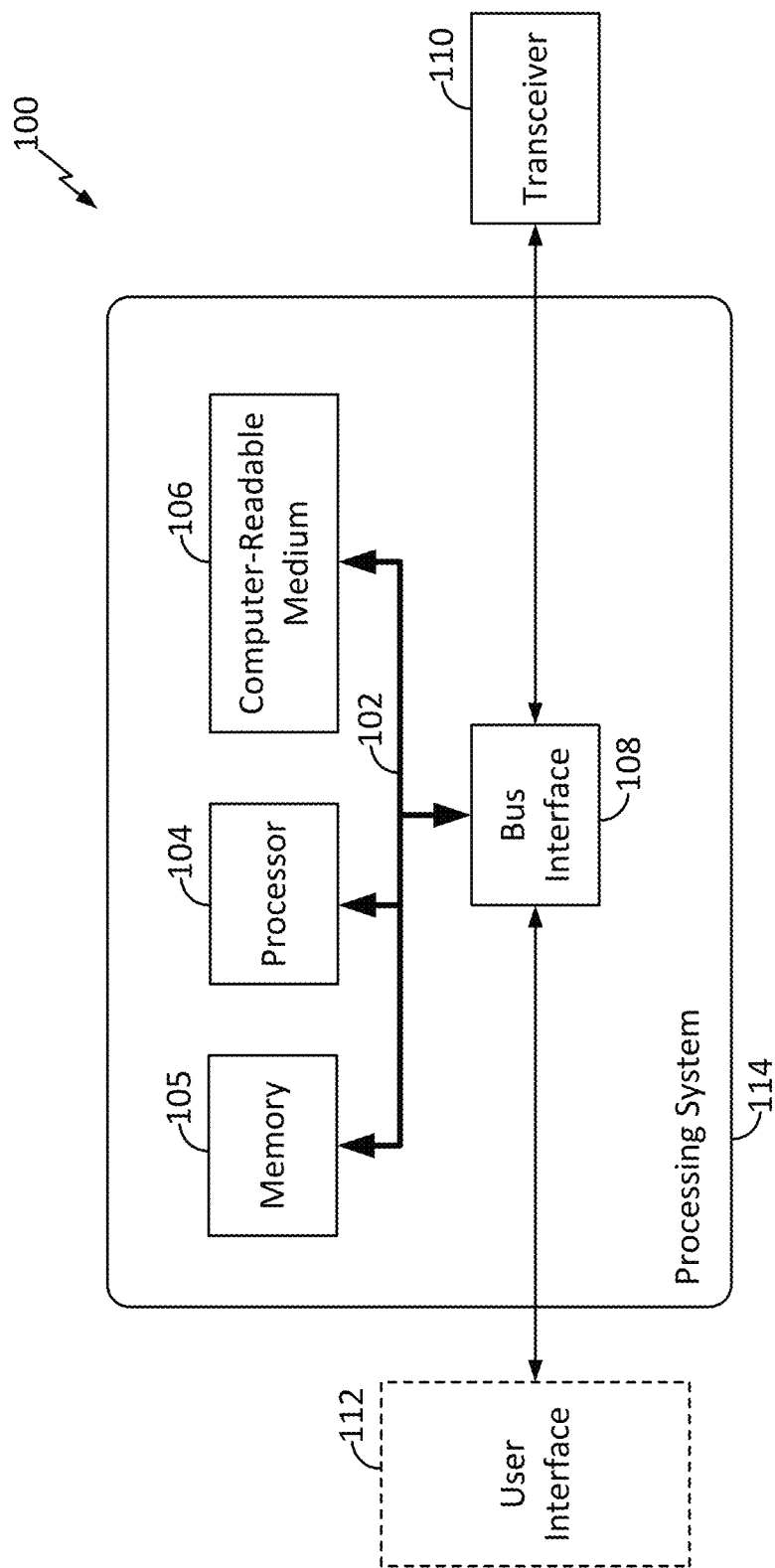
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the present disclosure, an element, or any portion of an element, or any combination of elements may be implemented with a processing system 114 that includes one or more processors 104. For example, in various aspects, the apparatus 100 may represent any one or more of a wireless dockee, a wireless docking host, and/or a peripheral device. Examples of processors 104 that may be utilized in an apparatus 100 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

One or more aspects of the disclosure relate to wireless docking systems. A wireless docking system can provide seamless connectivity, enabling a portable device such as a mobile handset, PDA, tablet computer, etc. to connect with a group of peripheral devices without needing wires or a docking connector, a PIN code or elaborate pairing process for between the dockee and each individual peripheral. The peripherals in any docking environment may act as a group, which needs only to be set up once. Many different types of peripherals may be supported in a docking environment, including the bridging of legacy peripherals. Ideally, the best link, protocol, and QoS would be automatically set up for each type of peripheral connection. The best connection may be selected depending on the application (e.g., for a productivity application, for watching videos, or for playing games, etc.), and the environment (e.g., the home enterprise, internet café, etc.). Here, existing application sessions/connections may be left intact.

Figure 2:
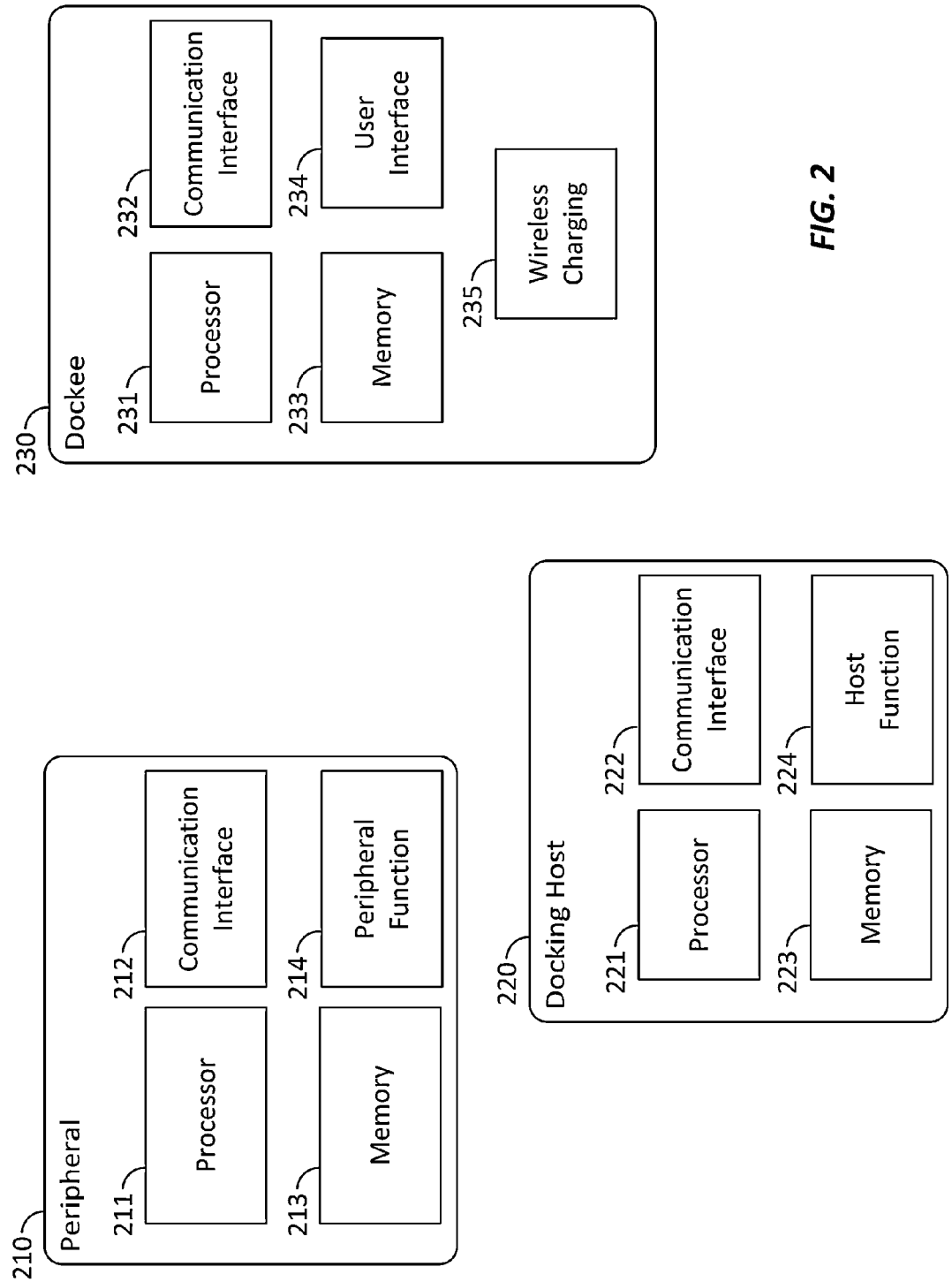
FIG. 2 is a simplified block diagram of a dockee, peripheral, and docking host as may be utilized for direct pairing according to one example.

FIG. 2 includes a simplified block diagram illustrating an exemplary peripheral 210, an exemplary docking host 220, and an exemplary dockee 230 in accordance with some aspects of the disclosure. In the illustrated example, the peripheral 210 includes at least one processor 211, a memory 213 communicatively coupled to the at least one processor 211, a communication interface 212 communicatively coupled to the at least one processor 211, and optional peripheral function circuitry 214. In some aspects of the disclosure, the at least one processor 211 may be the processor 104 included in the processing system 114 described above and illustrated in FIG. 1; similarly, the memory 212 may be the memory 105 described above and illustrated in FIG. 1.

In various aspects of the disclosure, the communication interface 212 may be a wireless interface configured for communication with a docking host 220. For example, the communication interface 212 may include a Wi-Fi interface compatible with any of the family of standards defined under the IEEE 802.11 standards, an IEEE 802.15.1 "Bluetooth" interface (e.g., configured according to Bluetooth Low Energy (BTLE) standards), an IEEE 802.15.4 "ZigBee" interface, or any other suitable wireless communication interface. Of course, some examples of a peripheral 210 may include two or more of the above-described or other communication interfaces. Further, when included in a peripheral 210, the peripheral function circuitry 214 may be embodied in any number of ways, including for example a user interface, a display, microphone, speaker, network interface, wireless charger, etc.

Further, in the illustrated example, the docking host 220 includes at least one processor 221, a communication interface 222 communicatively coupled to the at least one processor 221, a memory 223 communicatively coupled to the at least one processor 221, and host function circuitry 224 communicatively coupled to the at least one processor 221. In some aspects of the disclosure, the at least one processor 221 may be the processor 104 included in the processing system 114 described above and illustrated in FIG. 1; similarly, the memory 223 may be the memory 105 described above and illustrated in FIG. 1.

In various aspects of the disclosure, the communication interface 222 may include a Wi-Fi interface compatible with any of the family of standards defined under the IEEE 802.11 standards, an IEEE 802.15.1 "Bluetooth" interface (e.g., configured according to Bluetooth Low Energy (BTLE) standards), an IEEE 802.15.4 "ZigBee" interface, or any other suitable wireless communication interface. Of course, some examples of a docking host 220 may include two or more of the above-described or other communication interfaces. Further, when included in a docking host 220, the host function circuitry 224 may be embodied in any number of ways, including for example a user interface, a display, microphone, speaker, network interface, wireless charger, etc.

Still further, in the illustrated example, the dockee 230 includes at least one processor 231, a communication interface 232 communicatively coupled to the at least one processor 231, a memory 233 communicatively coupled to the at least one processor 231, a user interface 234 communicatively coupled to the at least one processor 231, and in some examples, wireless charging circuitry 235. In some aspects of the disclosure, the at least one processor 231 may be the processor 104 included in the processing system 114 described above and illustrated in FIG. 1; similarly, the memory 232 may be the memory 105 described above and illustrated in FIG. 1.

In various aspects of the disclosure, the communication interface 232 may include a Wi-Fi interface compatible with any of the family of standards defined under the IEEE 802.11 standards, an IEEE 802.15.1 "Bluetooth" interface (e.g., configured according to Bluetooth Low Energy (BTLE) standards), an IEEE 802.15.4 "ZigBee" interface, or any other suitable wireless communication interface. Of course, some examples of a dockee 230 may include two or more of the above-described or other communication interfaces.

In a further aspect of the disclosure, the dockee 230 may include a user interface 234 for input/output functionality enabling communication between a user and the wireless docking system. As an illustrative but non-limiting example, the dockee 230 may be embodied as a smartphone or tablet device, including a touch-screen interface providing user input and output functionality. Moreover, the wireless charging circuitry 235 at the dockee 230 may include suitable circuitry such as, but not limited to, an inductive coil, a resonant circuit, tuning circuitry, and/or any other suitable circuits, modules, or components to enable wireless charging of a battery at the dockee 230.

Figure 3:
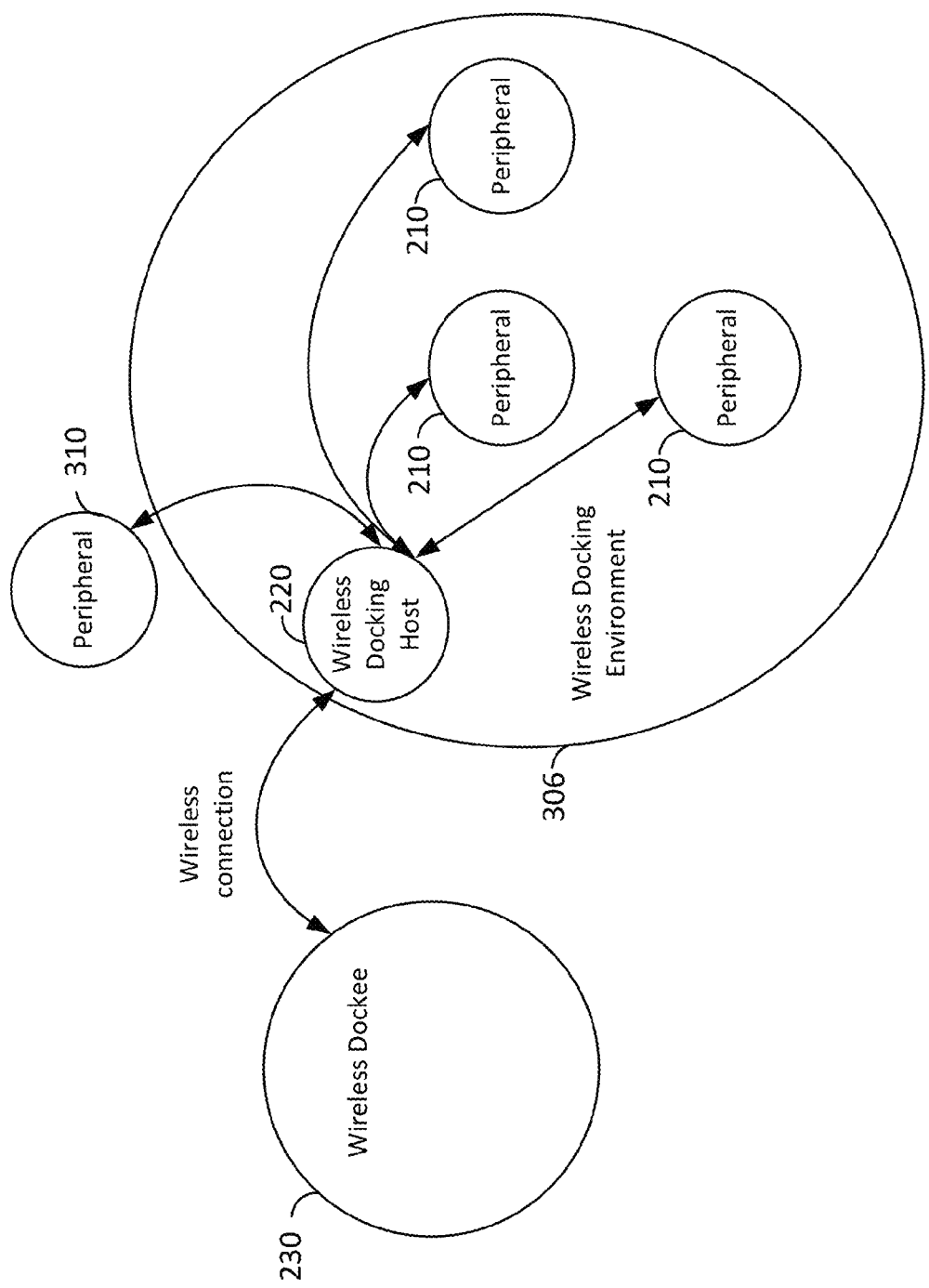
FIG. 3 is a simplified schematic diagram of a wireless docking system utilizing a docking environment according to one example.

A wireless docking system may provide a wireless connection between a wireless dockee and a wireless docking environment. FIG. 3 is a simplified schematic diagram that illustrates a wireless docking system 300 including a dockee 230 in wireless communication with a plurality of peripherals 210, 310 by way of a wireless docking host 220, as a part of a wireless docking environment 306.

The dockee 230 may be any suitable device capable of wirelessly connecting to the wireless docking environment 306 utilizing any suitable communication protocol, which may include but is not limited to IEEE 802.11 "Wi-Fi." By connecting to the wireless docking environment 306, the dockee 230 may be capable of connecting directly or indirectly to each of the peripherals 210 that are part of the wireless docking environment 306.

The wireless docking environment 306 is a group of one or more physical devices, including one or more wireless docking hosts 220 and one or more peripherals 210. A wireless docking environment 306 can take any suitable configuration or topology, for example, including nothing more than a wireless docking host 220, or additionally including one or more peripherals 210.

The peripherals 210 may represent logical peripheral functions. In general, a peripheral function may be any I/O function implemented in a wireless docking host 220 that can be made available to a wireless dockee 230 through any of various suitable wireless interfaces, or any I/O function in an external peripheral device 210 that can be made available to the wireless dockee 230 through the wireless docking host 220, where the external peripheral device may be directly connected to the wireless docking host 220. Peripherals 210 may in some examples be embodied as physical devices having wired and/or wireless interfaces for communicating with the wireless dockee 230 through the wireless docking host 220. Some nonlimiting examples of peripherals might include LCD monitors or other display devices, utilizing, e.g., an HDMI or VGA interface; speakers, microphones a keyboard, mouse, printer, scanner, camera, a mass storage device, etc. utilizing any suitable wired or wireless interface, such as USB; general purpose USB ports or hubs for coupling any suitable USB-compatible device; Ethernet ports for coupling to a network; or any other suitable device.

In the illustration, some peripherals 210 are shown in the wireless docking environment 306, and an extra peripheral 310 is shown outside the wireless docking environment 306. Here, this extra peripheral 310 illustrates that not necessarily all peripherals 210, 310 that are paired with the wireless docking host 220 are included in a particular wireless docking environment 306. That is, a wireless docking environment 306 associated with a wireless docking host 220 may include only a subset of the peripherals 210, 310 that are paired with, or in communication with the docking host 220. Moreover, the extra peripheral 310 may be one of numerous extra peripherals 310, and further, the wireless docking host 220 may provide a plurality of wireless docking environments such as the environment 306. Here, the set of peripherals 210 in a particular wireless docking environment 306 may include any number, from zero or greater, of peripherals, and further, in some examples, a particular peripheral 210, 310 may be included in zero, one, two, or more established wireless docking environments 306.

The wireless docking host 220 may be any suitable device capable of connecting to the wireless dockee 230 and one or more peripherals 210. For example, a wireless docking host 220 may make available to a wireless dockee 230 peripheral functions on external peripherals 210 that are connected to the docking host 220 directly, as well as peripheral functions the wireless docking host 220 itself may implement (e.g., a display).

The docking host 220 may provide different docking experiences or docking environments 306 to different dockees 230. For example, at a given time a dockee 230 may have a particular need for certain peripheral functions, and upon learning of this need, the docking host 220 may therefore provide a corresponding docking environment 306 for that dockee.

One example of a way for a docking host 220 to provide these capabilities to different dockees 230 is for the docking host 220 to preconfigure multiple docking environments 306. That is, multiple groups of peripherals 210 can be preconfigured at the docking host 220, e.g., by randomly selecting groups of available peripherals 210 or by selecting certain peripherals to be grouped together. Here, each group may be a logical group including suitable peripherals 210, which may be manually or automatically configured with the docking host 220.

In this example, the docking host 220 may group its attached and/or wirelessly paired peripherals 210 into multiple hierarchical groups and enable each dockee to use one group. For example, assume that a particular docking host 220 has peripherals A-G available. Here, peripherals A, B, and C may be grouped together into a first group, and peripherals D, E, F, and G may be grouped together into a second group. This way, the groups may be disjoint groups of peripherals. In another example, peripherals A, B, and C may be grouped together into a first group, and peripherals C, D, and E may be grouped together into a second group. This way, the groups may have some intersection or overlap of peripherals.

With a hierarchical grouping, separate groups of peripherals might be disjoint groups, and separate groups might have a common parent. For the common parent, peripherals A, B, C, D, E, and F might be a parent group in the hierarchy, and at the next level of the hierarchy, groups might include, for example, peripherals A, B, and C as a first group; and peripherals D, E, and F as a second group. By utilizing such groups of peripherals, each such group can be considered a separate wireless docking environment 306 as discussed above. That is, a particular wireless docking host 220 may be capable of providing any from a plurality of wireless docking environments 306 to a particular wireless dockee 230, each wireless docking environment 306 including a different group of peripherals that may be one of a plurality of preconfigured hierarchical groups.

As introduced above, wireless chargers have been known in the art, and provide the capability to charge battery-powered devices without any physical attachment or plug between the battery-powered device and the wireless charger. For example, inductive charging may be utilized, wherein energy is transferred from a primary coil in a wireless charger to a secondary coil in a battery-powered device by way of inductive coupling between the respective coils at each device. In the literature, such devices might additionally be referred to as inductive charging or contactless energy transfer.

One or more aspects of the present disclosure relate to the use and performance of a wireless docking environment 306 that includes a wireless charger. For illustrative but nonlimiting purposes, the functionality of a wireless docking environment including a wireless charger is described herein below in two specific examples. In the first example, illustrated in FIGS. 4-6, the wireless charger itself is integrated as a unit with the wireless docking host. In the second example, illustrated in FIGS. 7-10, the wireless charger is a peripheral, communicatively coupled with a separate docking host.

Wireless Docking Host-Charger

Figure 4:
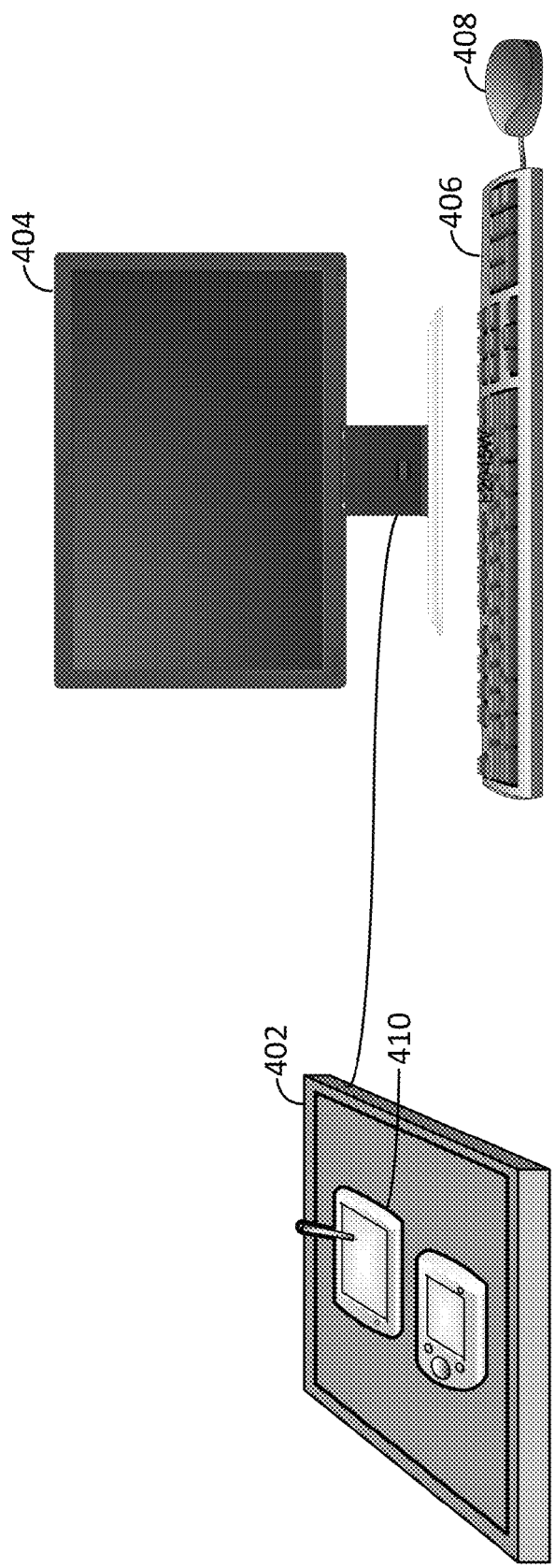
FIG. 4 is a schematic diagram illustrating a wireless docking environment including a wireless docking host having an integrated wireless charger according to one example.

FIG. 4 is a simplified schematic diagram illustrating an aspect of the disclosure that includes a host-charger 402. Here, the host-charger 402 may include a wireless docking host 220, as described above in relation to FIG. 2, wherein the host function circuitry 224 may include, at least in part, wireless charging circuitry such as an inductive charging coil configured to enable wireless charging of a proximate dockee.

As seen at FIG. 4, an exemplary docking environment may be configured wherein the host-charger 402 is connected to a monitor/display 404 by way of a physical cable, and a keyboard 406 and mouse 408 are wirelessly connected to the docking host 402. With this exemplary configuration, the display 404, keyboard 406, and mouse 408 may be peripherals 210 in a docking environment 306 managed by the host-charger 402. As will be discussed in further detail below, a handset/dockee 410 may land upon the host-charger 402 for charging its battery, as well as for entering into a docking session with the illustrated docking environment. Here, the dockee 410 may be the same as the dockee 230 described above in relation to FIG. 2.

Figure 5:
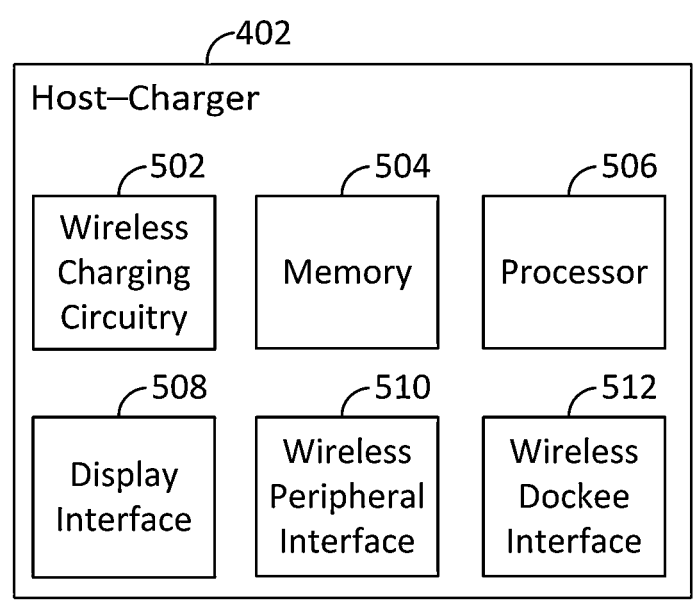
FIG. 5 is a simplified block diagram illustrating some of the components of a wireless docking host-charger in accordance with one example.

FIG. 5 is a block diagram illustrating additional detail of one example of a host-charger 402. Here, the host-charger 402 includes wireless charging circuitry 502, a memory 504, a processor 506, a display interface 508 for providing image information to the display 404, a wireless peripheral interface 510 for communicating with one or more wireless peripherals such as the keyboard 406 and/or the mouse 408, and a wireless dockee interface 512 for communicating with one or more wireless dockees 410, 230. In one example, the processor 506 and the memory 504 may be the same as the corresponding processor 221 and memory 223 illustrated in the docking host 220 in FIG. 2. Moreover, the wireless charging circuitry 502 may be included in the host function circuitry 224; and the display interface 508, the wireless peripheral interface 510, and the wireless dockee interface 512 may be the same as the communication interface 222.

Figure 6:
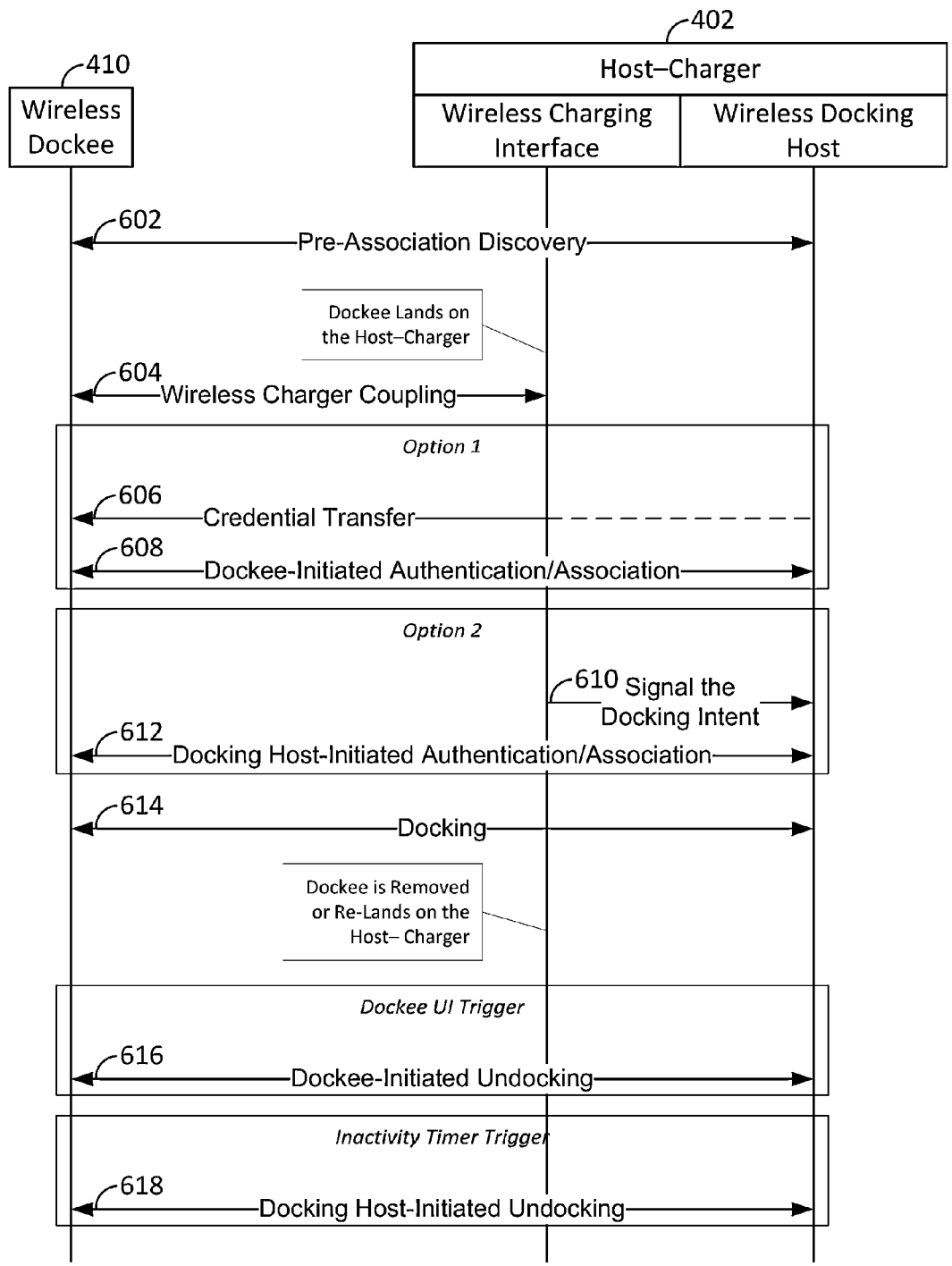
FIG. 6 is a call flow diagram illustrating a use case for a wireless docking environment including a wireless host-charger in accordance with one example.

FIG. 6 is a call flow diagram illustrating an example of a sequence of events that may occur utilizing the above-described host-charger 402 in the docking environment illustrated in FIG. 4 in accordance with an aspect of the disclosure.

First, a user with a handset, which may be configured as a wireless dockee 410, may enter the vicinity of the host-charger 402. Here, at a time prior to a placement of the dockee 410 onto the host-charger 402, the dockee 410 may detect the existence of the wireless docking environment hosted by the host-charger 402, and/or conduct various discovery operations for discovering or identifying services, peripherals, or other characteristics of the docking environment, e.g., by utilizing the communication interface 232. This is illustrated with pre-association discovery signal 602 between the dockee 410 and wireless docking host function of the host-charger 402.

When the dockee 410 lands on the host-charger 402, a wireless charger coupling 604 may be established between the wireless charging circuitry 502 at the host-charger 402 and the wireless charging circuitry 235 at the dockee 410. In an aspect of the disclosure, the establishment of this wireless charger coupling 604 may be utilized as a trigger, to establish a docking session between the dockee 410 and the host-charger 402. Here, if it is the first time that a docking session is to be established between this dockee 410 and host-charger 402, an initial pairing operation may be undertaken, for establishing an authentication of credentials between the dockee 410 and the host-charger 402 and an association between the devices.

To establish the pairing, in one aspect of the disclosure, at 606 the dockee 410 may automatically acquire credential information upon landing on the host-charger 402. For example, the credential information may be transmitted from the host-charger 402 to the dockee 410 utilizing a suitable communication interface. Here, the credential information may be transferred from the host-charger 402 to the dockee 410 utilizing the wireless dockee interface 512 (e.g., utilizing BTLE communication). In another example, the credential information may be transferred from the host-charger 402 to the dockee 410 utilizing the wireless charging circuitry 502, which may be configured for near-field communication (NFC). Once the credentials are obtained at the dockee 410, at 608, a dockee-initiated authentication/association operation may be undertaken between the dockee 410 and the host-charger 402, wherein the dockee 410 utilizes the credential information received at 606.

In another aspect of the disclosure, to establish the pairing, the dockee 410 may perform a Wi-Fi Simple Configuration (WSC) procedure. Here, at 610 the wireless charging function within the host-charger 402 may communicate, internally, with the integrated wireless docking host function within the host-charger 402, to signal the docking intent of the dockee 410. At this point, at 612 a docking host-initiated authentication/association operation may be undertaken between the dockee 410 and the host-charger 402.

Once the pairing is completed, at 614, a wireless connection may be established between the communication interface 232 at the dockee 410 and the wireless dockee interface 512 at the host-charger 402, corresponding to the initiation of a docking session. Here, the user of the dockee 410 may begin utilizing the peripherals (e.g., the keyboard 406, the mouse 408, and the display 404) corresponding to the docking environment.

During the duration of the docking session, at any time the user of the dockee 410 may pick up the dockee 410, e.g., for a phone call, without implementing an undocking procedure. That is, even though the dockee 410 is not landed on the host-charger 402, in an aspect of the disclosure, the wireless connection between the communication interface 232 at the dockee 410 and the wireless dockee interface 512 at the host-charger 402 may be maintained. During this time, while the dockee 410 is removed from the host-charger 402, it is possible that another user may land their own handset onto the host-charger 402. In one example, the wireless charging circuitry 502 at the host-charger 402 may continue to function, enabling this second handset to be charged; however, in this example, no docking session need be established between the host-charger 402 and the second handset. Rather, the docking session may be maintained between the dockee 410 and the host-charger 402. Thus, if and when the dockee 410 re-lands on the host-charger 402, a wireless charger coupling may be re-established, re-enabling charging of the dockee 410 while the docking session is maintained.

To un-dock the first handset 310 from the docking session, in one aspect of the disclosure, shown at 616, the user of the dockee 410 may implement explicit instructions to un-dock from the host-charger 402, e.g., utilizing the user interface 234 at the dockee 410. Of course, in another example, such an explicit instruction to terminate the docking session may be implemented utilizing one or more peripherals of the docking environment, such as the keyboard 406, the mouse 408, and/or the display 404.

In another aspect of the disclosure, the user may pick up their handset (i.e., the dockee 410) and leave the vicinity of the host-charger 402, causing a ceasing of communication between the communication interface 232 at the dockee 410 and the wireless dockee interface 512 at the host-charger 402. According to an aspect of the disclosure, this traffic inactivity may eventually result in the expiration of a traffic inactivity timer at the host-charger 402. As a result, the host-charger 402 may determine that there is no traffic activity for a certain length of time (e.g., a predetermined length of time), and accordingly, at 618 a docking host-initiated undocking procedure may commence, terminating the docking session between the dockee 410 and the host-charger 402.

Wireless Charger as a Peripheral

Figure 7:
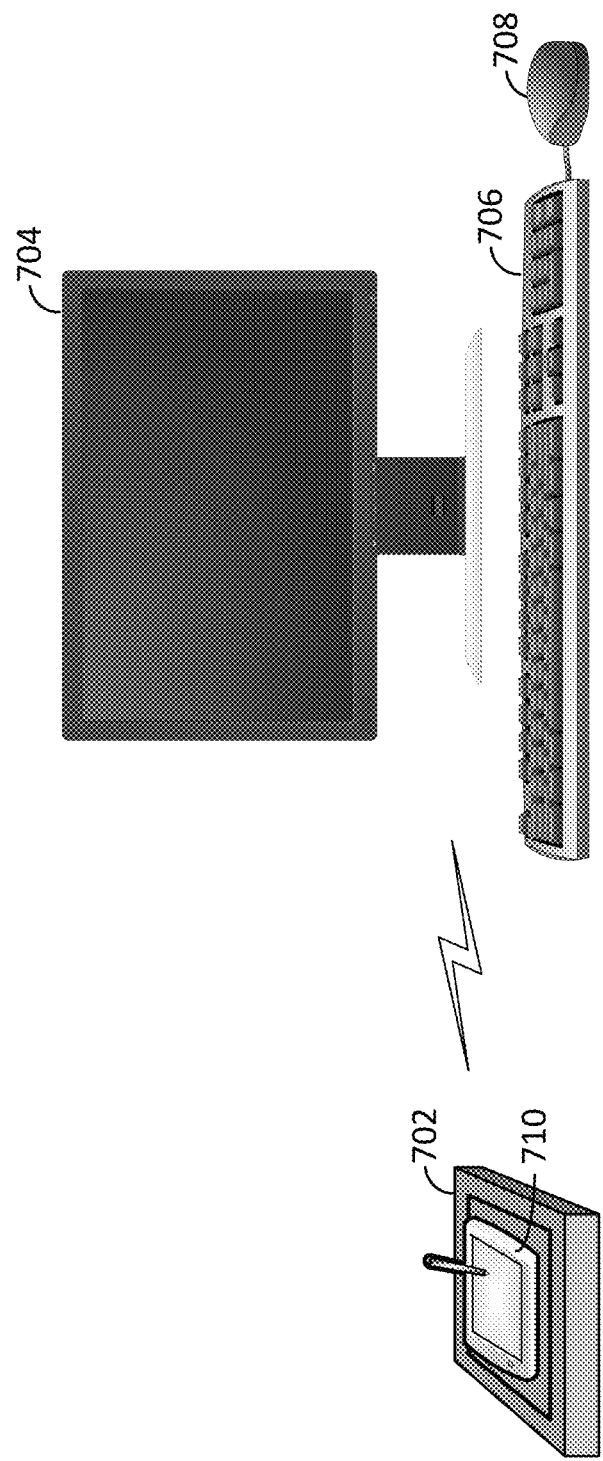
FIG. 7 is a schematic diagram illustrating a wireless docking environment including a wireless docking host-display and a wireless charger as a peripheral in accordance with one example.
Figure 8:
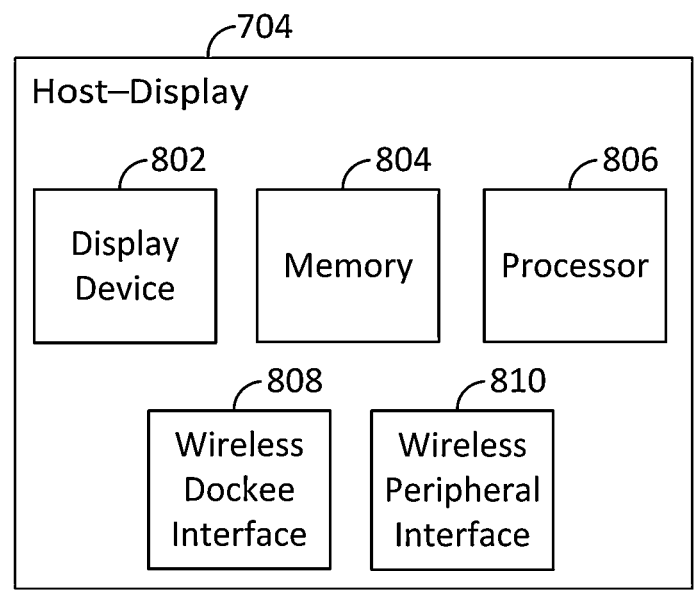
FIG. 8 is a simplified block diagram illustrating some of the components of a wireless docking host-display in accordance with one example.

FIG. 7 is a simplified schematic diagram illustrating another aspect of the disclosure that includes a wireless charger 702 that functions as a peripheral device in a docking environment. For example, the wireless charger 702 may be the same as the peripheral 210 illustrated in FIG. 2, wherein the peripheral function circuitry 214 includes, at least in part, wireless charging circuitry as described above.

In a further aspect of the disclosure, a docking host may be embedded in, or otherwise attached or coupled to a monitor/display 704. That is, referring now to FIG. 8, a wireless docking host-display 704 according to an aspect of the disclosure may include not only a display device 802, but additionally, a memory 804 and processor 806 for implementing the functionality of the docking host; a wireless dockee interface 808 for communication with one or more dockees such as a dockee 710 during a docking session; and a wireless peripheral interface 810 for communicating with one or more peripherals, such as the wireless charger 702, a keyboard 706, and a mouse 708. In one example, the processor 806 and the memory 804 may be the same as the corresponding processor 221 and memory 223 illustrated in the docking host 220 in FIG. 2. Moreover, the wireless dockee interface 808 and the wireless peripheral interface 810 may be the same as the communication interface 222. Of course, this is merely one example described in detail for illustrative purposes, and in various examples within the scope of the disclosure, the docking host may be communicatively coupled with the display in any suitable fashion known to those of ordinary skill in the art.

Referring once again to FIG. 7, an exemplary docking environment may be configured wherein the host-display 704 may host a docking environment that includes, as peripherals, the wireless charger 702, a keyboard 706, and a mouse 708. As will be discussed in further detail below, the handset/dockee 710 may land upon the peripheral wireless charger 702 for charging its battery, as well as for entering into a docking session with the illustrated docking environment.

Figure 9:
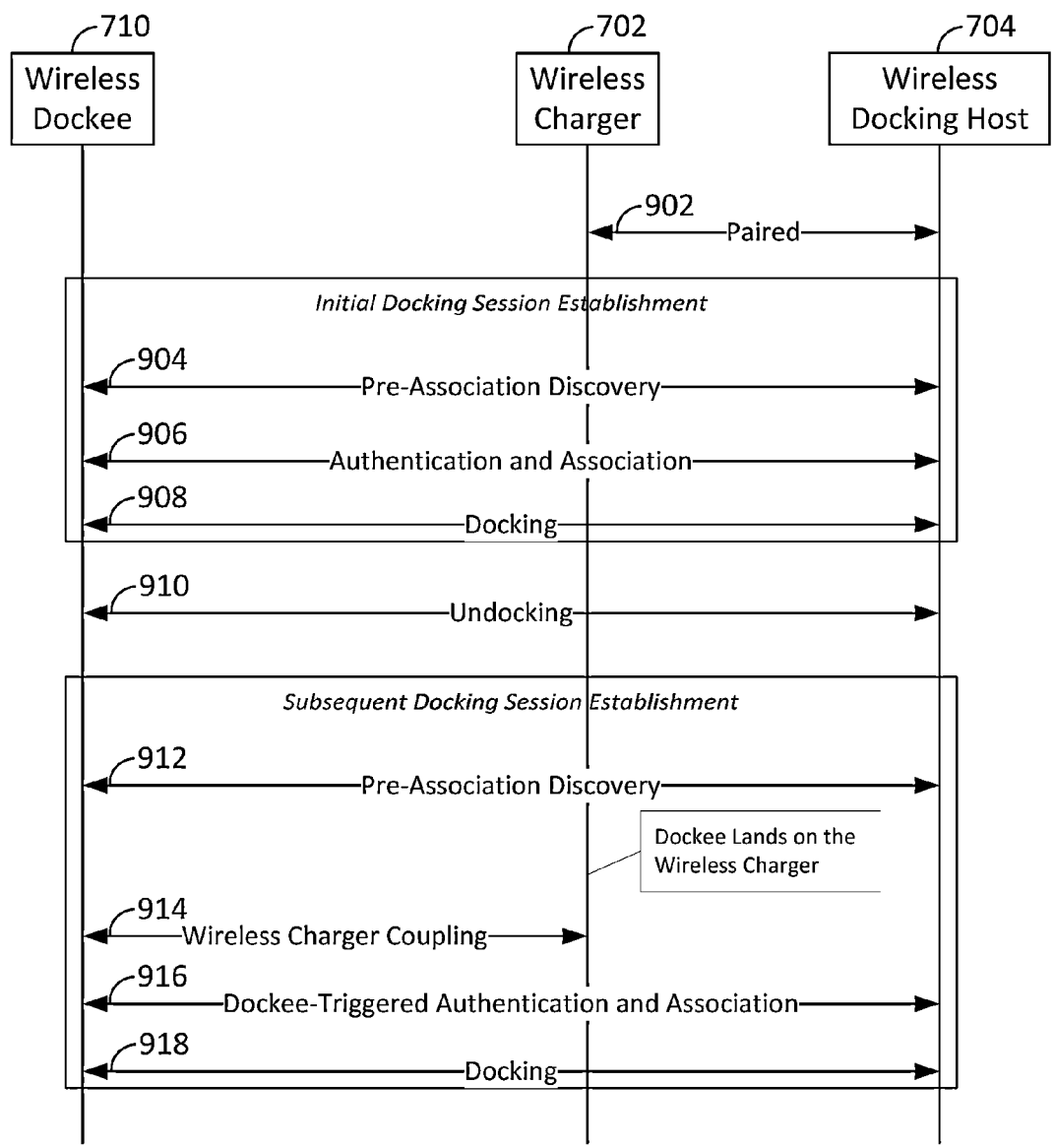
FIG. 9 is a call flow diagram illustrating a use case for a wireless docking environment including a wireless charger as a peripheral in accordance with one example.

In accordance with some aspects of the disclosure, at least two different use cases may exist for the establishment of a docking environment by landing the dockee 710 on the wireless charger 702. In a first example, as illustrated in FIG. 9, the wireless charger 702 may be used to help the dockee 710 to dock with the docking host-display 704. In a second example, the use of the wireless charger 702 by the dockee 710 may need to be authorized by the docking host.

FIG. 9 is a call flow diagram illustrating a first example of a sequence of events that may occur utilizing the above-described wireless charger 702 in the docking environment illustrated in FIG. 7 in accordance with an aspect of the disclosure. In this example, an initial docking session is utilized to establish the wireless charger 702 as a peripheral in a wireless docking environment offered by this wireless docking host (i.e., the host-display 704), and as an illustrative example, the wireless charger 704 is utilized by the dockee 710 for charging in a subsequent docking session.

As a peripheral device 210, the wireless charger 702 may include a communication interface (e.g., the communication interface 212) for communicating with the wireless docking host-display 704. Further, the host-display 704 may be capable of informing the dockee 710 that the wireless charger 702 is one of its peripherals, e.g., by way of its wireless dockee interface 808. Still further, the dockee 710 may be enabled to identify a coupled wireless charger 702 with its detected wireless docking environment, e.g., as communicated to the dockee 710 by way of the host-display 704. Further, the dockee 710 may include functionality to couple with the wireless charger 702, as described below, as a trigger to establish the docking session.

Referring now to the call flow diagram of FIG. 9, the wireless charger 702 is shown being paired with the docking host 704 as a peripheral in a docking environment, as illustrated at 902. At this time, an initial docking session may be established. That is, the user in possession of the dockee 710 may enter the vicinity of the wireless charger 702. Here, the dockee 710 may detect the existence of the wireless docking environment hosted by the host-display 704, wherein, as described above, the wireless docking environment includes the wireless charger 702 as a peripheral. Thus, at 904, a pre-association discovery phase may occur between the docking host 704 and the handset 710. As described above, the pre-association discovery phase may include the dockee 710 detecting the existence of the wireless docking environment hosted by the host-display 704, and/or conducting various discovery operations for discovering or identifying services, peripherals, or other characteristics of the docking environment, e.g., by utilizing the communication interface 232.

Here, since this initial docking session establishment is the first time that a docking session is to be established between this dockee 710 and this host-display 704, an initial pairing operation may be undertaken. To this end, an authentication and association operation 906 may be undertaken between the dockee 710 and the host-display 704 for establishing an authentication of credentials between the dockee 710 and the host-display 704 and an association between the devices.

Once the docking session 908 is established, the dockee 710 may record the wireless charger 702 as a peripheral in the wireless docking environment offered by the host-display 704, and thereby the dockee 710 may begin using the peripherals connected to the docking host (e.g., the keyboard, the mouse, the display, and the wireless charger 702).

At 910, the dockee 710 may undock from the host-display 704 as described above, e.g., either by the user picking up the dockee 710 and leaving the vicinity of the docking host 704 for a predetermined length of time, or by an explicit undocking procedure undertaken by the user of the dockee 710.

In an aspect of the disclosure, with this docking environment information stored at the dockee 710, the docking environment including the wireless charger 702 may be a persistent docking environment, the subsequent establishment of which may be triggered by the landing of the dockee 710 on the wireless charger 702, as described below.

In this example, the user may subsequently approach the vicinity of the wireless charger 702 with the dockee 710, at which time a pre-association discovery operation 912 may again take place between the dockee 710 and the host-display 704, as described above. Here, because the dockee 710 and the host-display 704 have previously established a docking session, as described above, the wireless charger 702 is recorded at the dockee 710 as a peripheral in the wireless docking environment. Thus, once the dockee 710 lands on the wireless charger 702, such that the wireless charger coupling 914 occurs between the dockee 710 and the wireless charger 702, the dockee 710 may initiate a dockee-triggered authentication and association operation 916, utilizing credential information stored at the dockee 710 during the initial docking session, described above. At this time, the docking session 918 may commence between the dockee 710 and the docking host 704.

Those of ordinary skill in the art will recognize that the above-described example, including the utilization of a persistent docking environment, is merely illustrative in nature and is not intended to be limiting on the paradigm of utilizing the landing of the dockee 710 upon the wireless charger 702 as a trigger to initiate the establishment of a docking session. That is, the landing of the dockee 710 on the wireless charger 702 may trigger the establishment of any suitable docking session, including but not limited to an initial docking session, a subsequent docking session, a persistent docking session, etc.

Figure 10:
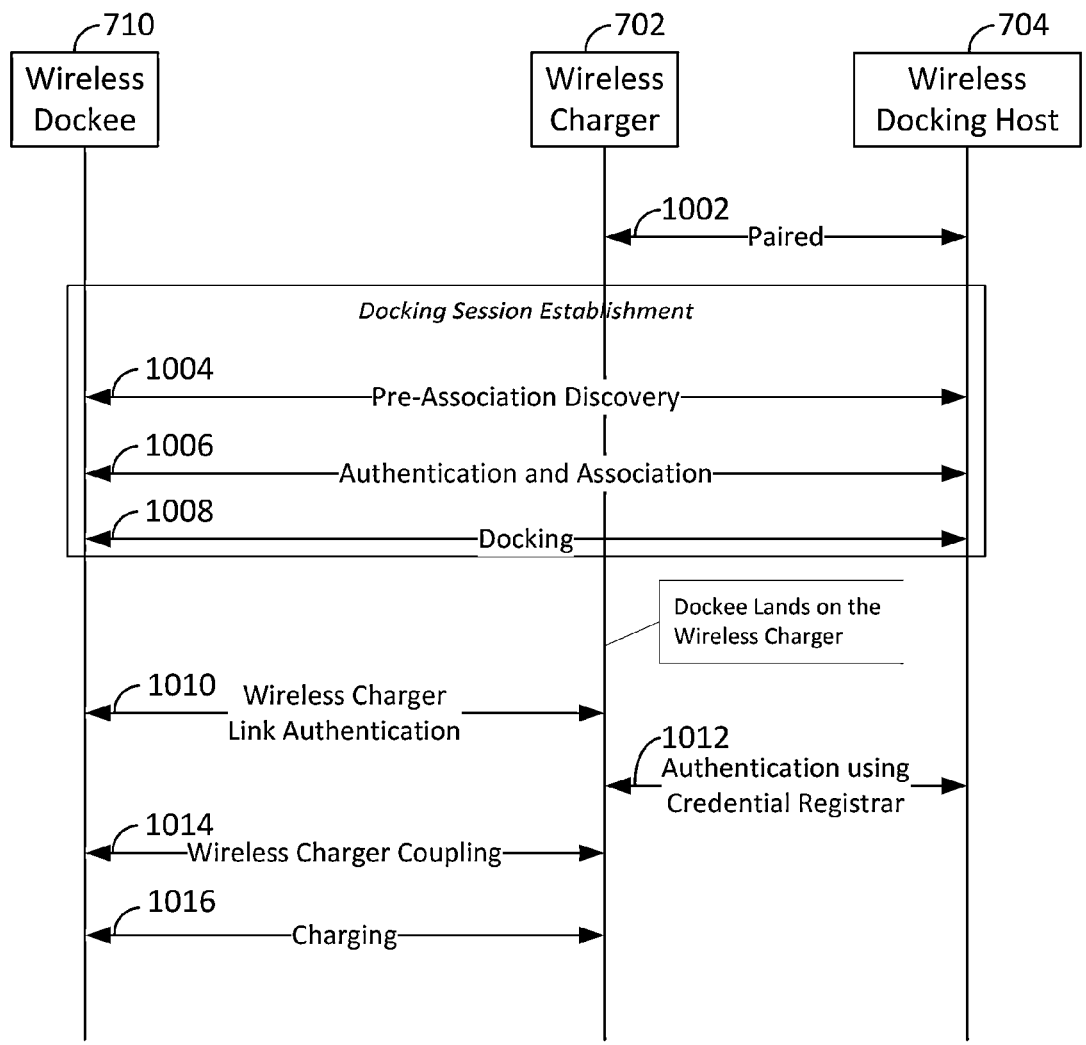
FIG. 10 is a call flow diagram illustrating a use case for a wireless docking environment including a wireless charger as a peripheral in accordance with another example.

FIG. 10 is a call flow diagram illustrating a second example of a sequence of events that may occur in use of the wireless charger 702 in the docking environment illustrated in FIG. 7 in accordance with another aspect of the disclosure.

In this example, the wireless charger 702 may be configured to perform an authentication procedure with the dockee 710 before enabling a wireless charging operation. To this end, as described below, the dockee 710 may enter into a docking session utilizing a docking environment that includes the wireless charger 702 as a peripheral, prior to enabling the wireless charger 702 to charge the dockee 710. That is, in accordance with an aspect of the disclosure, a charging function corresponding to the wireless charger 702 may be disabled until such time as the wireless dockee 710 enters into a docking session with the wireless docking host-display 704. In this way, the wireless docking host-display 704 may be enabled to act as a credential registrar for the wireless charger 702, in order to authenticate and authorize the dockee 710 to use the wireless charger 702.

Finally, in some examples, the wireless charger 702 may be required to check with the wireless docking host 704 to determine the handset's docking status, to determine whether to continue charging the handset 710.

Referring now to the call flow diagram of FIG. 10, the wireless charger 702 is shown being paired with the docking host 704 as a peripheral in a docking environment, as illustrated at 1002. At this time, a docking session may be established. That is, the user in possession of the dockee 710 may detect the existence of the wireless docking environment hosted by the host/monitor 704, wherein, as described above, the wireless docking environment includes the wireless charger 702 as a peripheral. Thus, at 1004, a pre-association discovery phase may occur between the docking host 704 and the handset 710. As described above, the pre-association discovery phase may include the dockee 710 detecting the existence of the wireless docking environment hosted by the host-display 704, and/or conducting various discovery operations for discovering or identifying services, peripherals, or other characteristics of the docking environment, e.g., by utilizing the communication interface 232.

At 1006, an authentication and association operation may be undertaken between the dockee 710 and the host-display 704 for establishing an authentication of credentials between the dockee 710 and the host-display 704 and an association between the devices.

Once the docking session 1008 is established, the user of the dockee 710 may begin utilizing the peripherals connected to the docking host 704, such as the keyboard, mouse, and display, as well as the wireless charger. In an aspect of the disclosure, to provide functionality at the wireless charger 702, at 1010, after the user lands the dockee 710 on the wireless charger 702, a wireless charger link authentication operation may be undertaken between the wireless charger 702 and the dockee 710. For example, communication between the dockee 710 and the wireless charger 702 may take place upon landing on the wireless charger 702, wherein the communication may include NFC or other suitable communication. This communication may include, for example a request from the dockee 710 for authentication to utilize the wireless charging function.

Here, at 1012, authentication utilizing the host-display 704 as a credential registrar may be undertaken, wherein, for example, the wireless charger 702 may request credential information corresponding to the dockee 710 from the host-display 704. Here, the host-display 704 may provide credential information corresponding to the dockee 710 to the wireless charger 702, indicating that the wireless charging function at the wireless charger 702 is authorized for the dockee 710.

Once the dockee 710 has been authenticated to the wireless charger 702, a wireless charger coupling 1014 between the wireless charger 702 and the dockee 710 may be established, such that, at 1016, the dockee 710 may charge its battery.

FIGS. 11-14 are flow charts illustrating certain exemplary processes for establishing a docking session with a docking environment that includes a wireless charger, in accordance with various aspects of the present disclosure.

Figure 11:
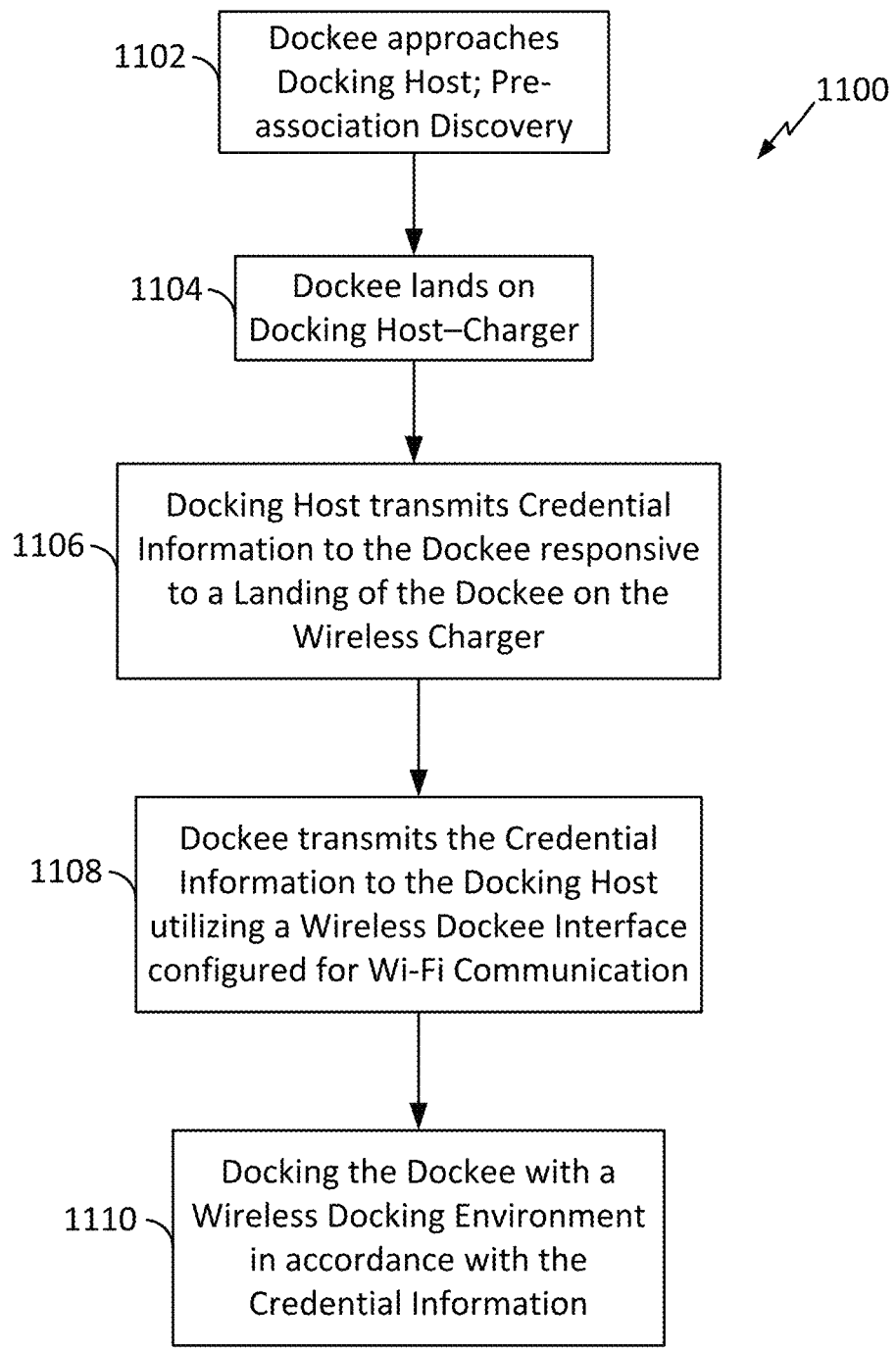
FIG. 11 is a flow chart illustrating a process of establishing a docking session with a wireless docking host-charger in accordance with one example.

For example, FIG. 11 describes a process that may be operable by a dockee 410 and a docking host-charger 402 as illustrated in FIG. 4. In the illustrated process 1100, at step 1102, as the dockee 410 approaches the wireless docking host-charger 402, by virtue of their respective communication interfaces (e.g., Wi-Fi, BTLE, or any other suitable wireless communication technology), a pre-association discovery process may take place, wherein the dockee 410 may detect the existence of the wireless docking environment hosted by the host-charger 402, and/or conduct various discovery operations for discovering or identifying services, peripherals, or other characteristics of the docking environment. Either during this discovery procedure, or after its completion, at step 1104 the dockee 410 may land on the wireless charger portion of the host-charger 402. For example, after entering the room in which the host-charger 402 is located, the user may place the dockee in their possession onto the wireless charger portion of the host-charger 402, e.g., with an intent to charge the battery of the dockee, and/or to utilize one or more peripherals in the associated docking environment.

In response to the landing of the dockee 410 on the host-charger 402, at step 1106 the wireless docking host-charger 402 may transmit credential information to the dockee 410. In one example, the wireless docking host-charger 402 may utilize its wireless dockee interface 512 to transmit the credential information to the dockee 410. For example, the pre-association discovery phase described above at step 1102 may establish a channel on which the credential information may be carried. In another example, the wireless docking host-charger 402 may utilize its wireless charging circuitry 502, which may be configured for NFC, to transmit the credential information to the dockee 410.

At step 1108, the dockee 410 may transmit the credential information (or information corresponding thereto) back to the wireless docking host-charger 402, and at step 1110, the wireless docking host-charger may dock the dockee 410 with a suitable docking environment in accordance with the received credential information. That is, by utilizing the credential information received at step 1106, the dockee 410 may initiate an authentication/association operation to establish a secure docking session with the wireless docking host-charger 402.

Figure 12:
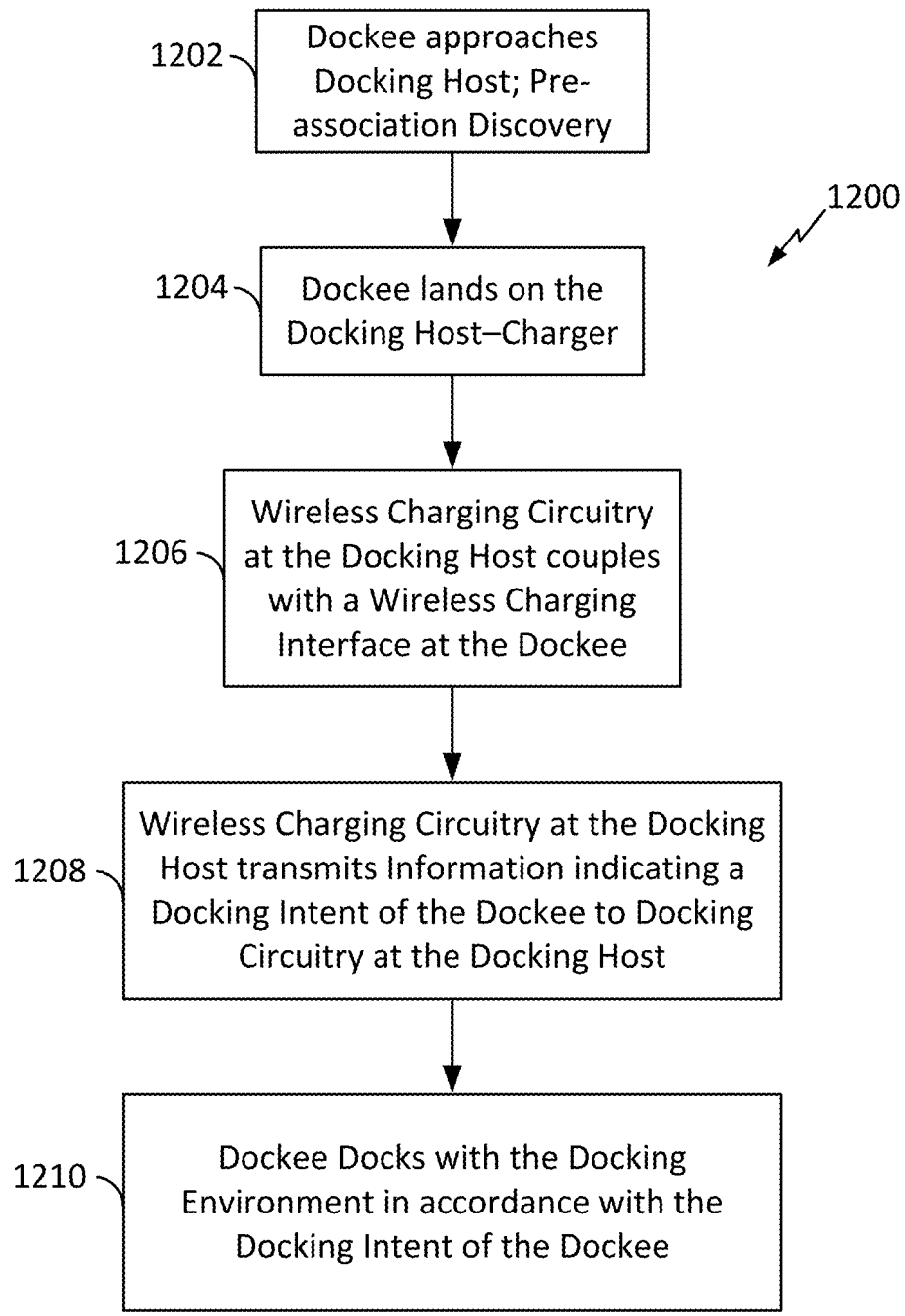
FIG. 12 is a flow chart illustrating a process of establishing a docking session with a wireless docking host-charger in accordance with another example.

FIG. 12 describes another process that may be operable by a dockee 410 and a docking host-charger 402 as illustrated in FIG. 4. In the illustrated process 1200, at step 1202, the as the dockee 410 approaches the wireless docking host-charger 402, by virtue of their respective communication interfaces (e.g., Wi-Fi, BTLE, or any other suitable wireless communication technology), a pre-association discovery process may take place, wherein the dockee 410 may detect the existence of the wireless docking environment hosted by the host-charger 402, and/or conduct various discovery operations for discovering or identifying services, peripherals, or other characteristics of the docking environment. Either during this discovery procedure, or after its completion, at step 1204 the dockee 410 may land on the wireless charger portion of the host-charger 402. For example, after entering the room in which the host-charger 402 is located, the user may place the dockee in their possession onto the wireless charger portion of the host-charger 402, e.g., with an intent to charge the battery of the dockee, and/or to utilize one or more peripherals in the associated docking environment.

In response to the landing of the dockee 410 on the host-charger 402, at step 1206, wireless charging circuitry 502 at the host-charger 402 may couple with a wireless charging interface at the dockee 410. Further, at step 1208, wireless charging circuitry 502 at the wireless docking host-charger 402 may transmit information indicating a docking intent of the dockee 410 to docking circuitry (e.g., the processor 506) at the wireless docking host-charger 402. For example, any suitable information may indicate the docking intent of the dockee 410, such as an information element configured to indicate the docking intent and/or other information corresponding to the dockee 410, or any suitable symbol that the host-charger 402 may take as indicating the docking intent. Thus, at step 1210, the dockee 410 may dock with a docking environment in accordance with the docking intent of the dockee 410.

Figure 13:
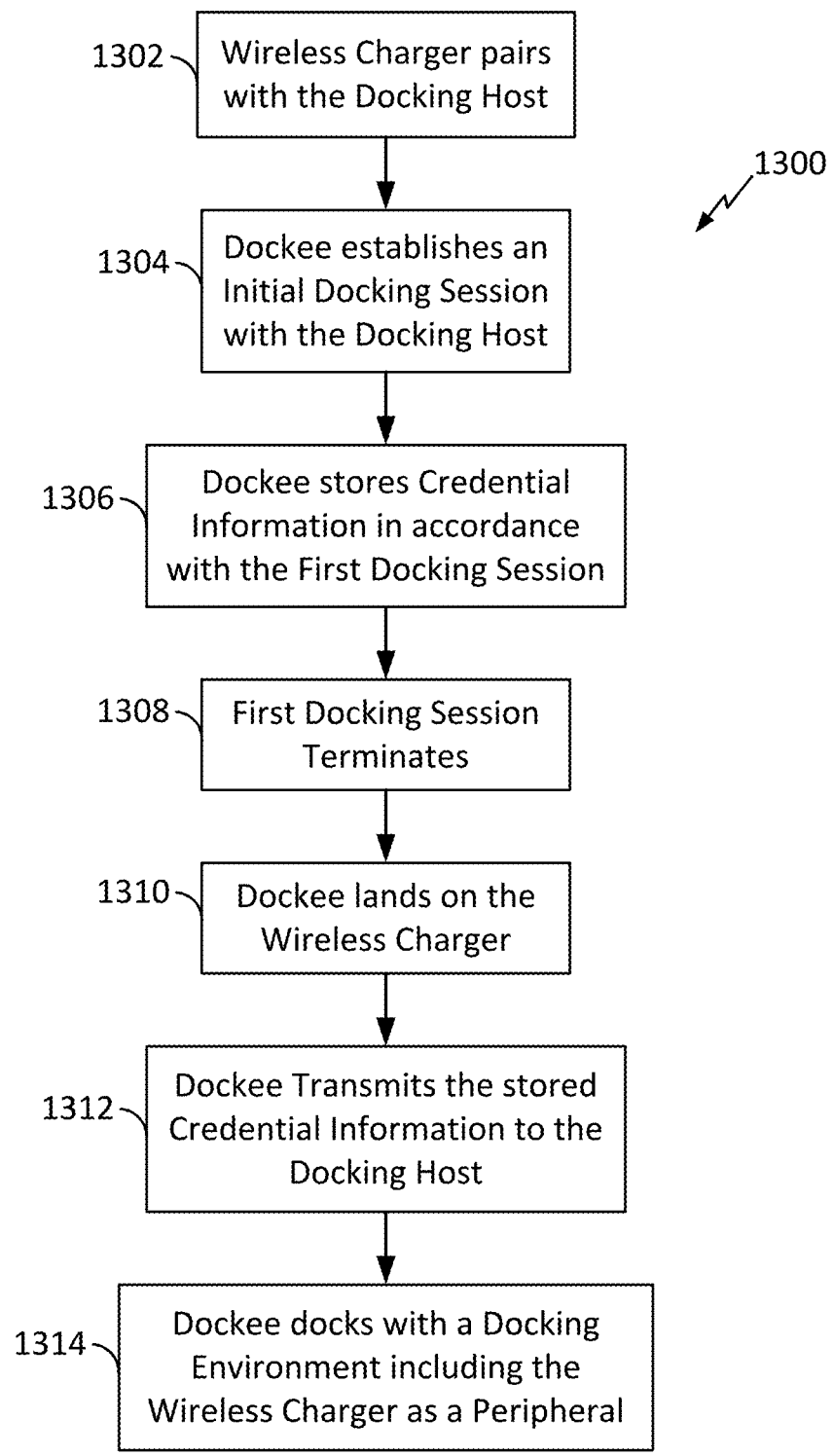
FIG. 13 is a flow chart illustrating a process of establishing a docking session with a wireless docking host-charger in accordance with another example.

FIG. 13 describes a process that may be operable by a dockee 710 and a wireless docking host (e.g., the host-display 704) as illustrated in FIG. 7. In the illustrated process 1300, at step 1302, a pairing may be established between a wireless charger 702 and the wireless docking host-display 704. Accordingly, the docking host may have the wireless charger 702 available for use as a peripheral in a suitable docking environment.

At step 1304, the wireless dockee 710 may establish a first (initial) docking session with the wireless docking host-display 704. As described above in relation to FIG. 9, the establishment of the initial docking session may include pre-association discovery, authentication and association between the dockee 710 and the docking host 704, and docking. Accordingly, at step 1306, the dockee 710 may store credential information in accordance with the docking session. Later, at step 1308, based on the user leaving with the dockee 710, causing the expiration of an inactivity timer, or the user explicitly terminating the docking session by way of an instruction, the initial docking session may terminate.

At step 1310, the user may return with dockee 710, and may land the dockee 710 on the wireless charger, thereby establishing a coupling with the wireless charger utilizing the wireless charging interface at the dockee. At step 1312, the dockee 710 may transmit the stored credential information to the docking host 702 in response to the landing on the wireless charger. For example, the dockee 710 may utilize its wireless docking host interface for the transmission of the stored credential information. Thereby, the dockee 710 may dock with the docking environment that includes the wireless charger as a peripheral, in accordance with the transmitted credential information.

Figure 14:
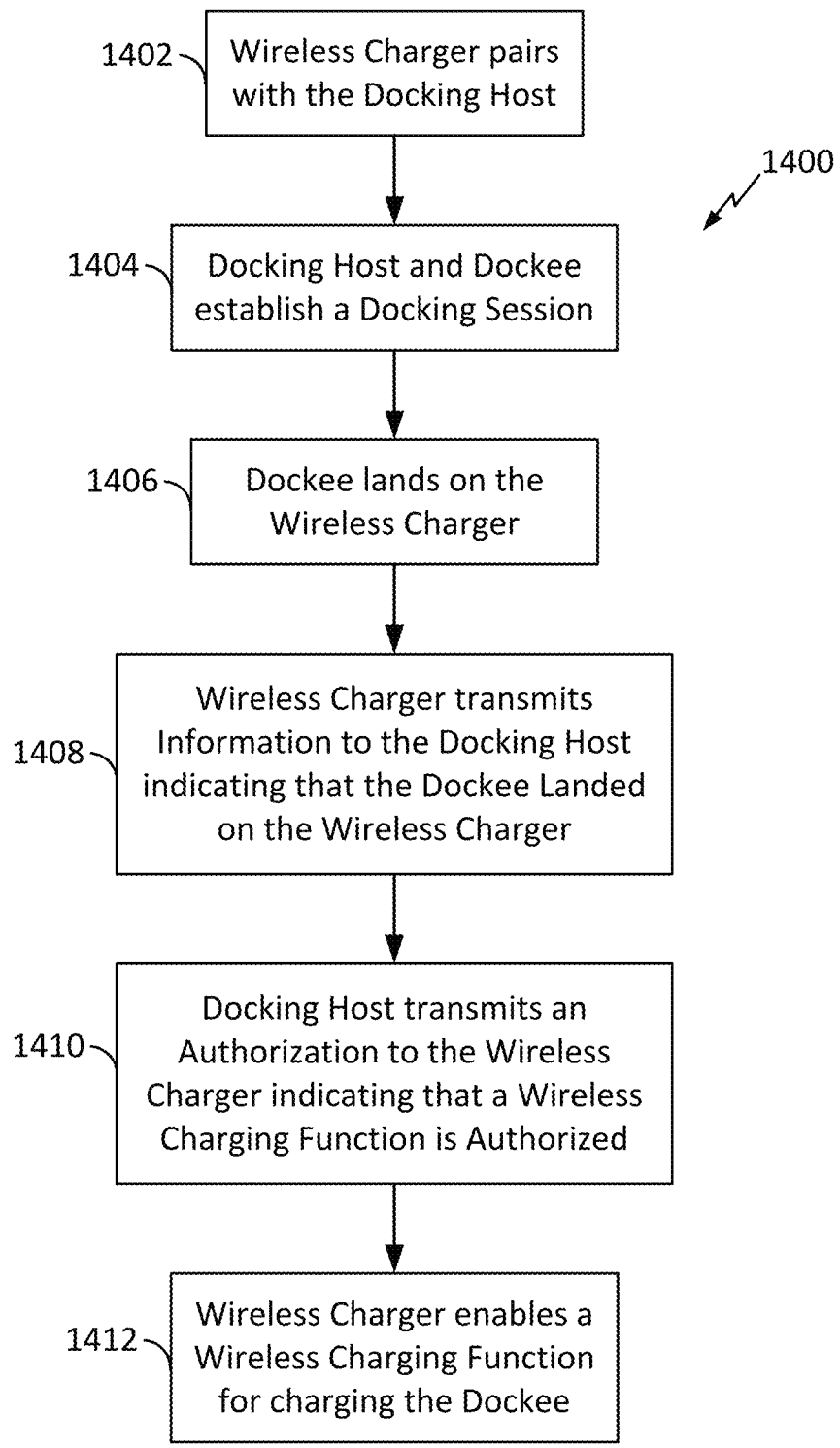
FIG. 14 is a flow chart illustrating a process of enabling a wireless charging function at a wireless charger utilizing a wireless docking environment in accordance with one example.

FIG. 14 describes another process that may be operable by a dockee 710 and a wireless docking host (e.g., the host-display 704) as illustrated in FIG. 7. In the illustrated process 1400, at step 1402, a pairing may be established between a wireless charger 702 and the wireless docking host-display 704. Accordingly, the docking host may have the wireless charger 702 available for use as a peripheral in a suitable docking environment.

At step 1404, the wireless dockee 710 may establish a docking session with the wireless docking host-display 704. As described above in relation to FIG. 10, the establishment of the docking session may include pre-association discovery, authentication and association between the dockee 710 and the docking host 704, and docking.

Once the docking session is established, at step 1406, the dockee 710 may land on the wireless charger 702. Accordingly, at step 1408, the wireless charger 702 may transmit information to the docking host-display 704 indicating that the dockee 710 landed on the wireless charger 702. In various examples, the information transmitted from the wireless charger 702 to the docking host-display 704 may be carried over the air utilizing any suitable communication interface, including but not limited to a wireless dockee interface 808 configured for NFC, or a wireless peripheral interface 810 configured for Wi-Fi or BTLE communication. In response to the information transmitted in step 1408, at step 1410 the docking host-display 704 may transmit an authorization to the wireless charger 702, indicating that a wireless charging function is authorized. Accordingly, at step 1412, the wireless charger 702 may enable the wireless charging function for charging the dockee 710.

Several aspects of a wireless docking system have been presented with reference to a system utilizing IEEE 802.11 "Wi-Fi" communication protocols. As those skilled in the art will readily appreciate, various aspects described throughout this disclosure may be extended to other communication systems, network architectures and communication standards. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operable at a docking host for docking a dockee with a docking environment managed by the docking host, the method comprising:
   transmitting credential information from the docking host to the dockee responsive to a landing of the dockee on a wireless charger;
   receiving a request from the dockee to initiate an authentication/association operation with the dockee;
   docking the dockee with the docking environment in accordance with the credential information; and
   terminating the dock between the dockee and the docking environment responsive to an expiration of an inactivity timer indicating inactivity of a communication interface for communicating with the dockee.

2. The method of claim 1, wherein the wireless charging circuitry is configured for near-field communication, and wherein the transmitting credential information comprises utilizing the wireless charging circuitry.

3. The method of claim 1, wherein the transmitting credential information comprises utilizing at least one of a Bluetooth Low Energy (BTLE) communication interface or a wireless fidelity (Wi-Fi) communication interface.

4. The method of claim 1, wherein the docking of the dockee with the docking environment comprises utilizing at least one of a Bluetooth Low Energy (BTLE) communication interface or a wireless fidelity (Wi-Fi) communication interface.

5. The method of claim 1, wherein the wireless charger is integral to the docking host.

6. The method of claim 1, further comprising:
   receiving a device other than the dockee on the wireless charger while the dockee remains docked with the docking environment; and
   charging the device utilizing the wireless charger without docking with the device.

7. The method of claim 1, wherein the terminating the dock between the dockee and the docking environment occurs when the dockee leaves the vicinity of the docking host.

8. A method operable at a dockee for docking with a docking environment managed by a docking host, the method comprising:
   receiving credential information from the docking host responsive to a landing of the dockee on a wireless charger;
   transmitting a request to initiate an authentication/association operation with the docking host;
   docking with the docking environment in accordance with the credential information; and
   terminating the dock between the dockee and the docking environment responsive to an expiration of an inactivity timer indicating inactivity of a communication interface for communicating with the dockee.

9. The method of claim 8, wherein the wireless charging interface is configured for near-field communication, and wherein the receiving credential information comprises utilizing the wireless charging interface.

10. The method of claim 8, wherein the receiving credential information comprises utilizing at least one of a Bluetooth Low Energy (BTLE) communication interface or a wireless fidelity (Wi-Fi) communication interface.

11. The method of claim 8, wherein the docking with the docking environment comprises utilizing at least one of a Bluetooth Low Energy (BTLE) communication interface or a wireless fidelity (Wi-Fi) communication interface.

12. The method of claim 8, further comprising:
   maintaining the docking with the docking environment while being removed from the wireless charger.

13. A method operable at a docking host for docking a dockee with a docking environment managed by the docking host, the method comprising:
   coupling wireless charging circuitry at the docking host with the dockee upon its landing on the docking host;
   transmitting, from the wireless charging circuitry at the docking host, to docking circuitry at the wireless docking host, information indicating a docking intent of the dockee;
   docking the dockee with the docking environment in accordance with the docking intent of the dockee; and
   terminating the dock between the dockee and the docking environment responsive to an expiration of an inactivity timer indicating inactivity of a communication interface for communicating with the dockee.

14. The method of claim 13, wherein the wireless charging circuitry is part of a wireless charger that is integral to the docking host.

15. The method of claim 14, further comprising:
   receiving a device other than the dockee on the wireless charger while the dockee remains docked with the docking environment; and
   charging the device utilizing the wireless charger without docking with the device.

16. A method operable at a dockee for docking with a docking environment managed by a docking host, the method comprising:
   landing on the docking host, wherein the docking host comprises wireless charging circuitry;
   docking with the docking environment in accordance with a docking intent of the dockee, wherein the docking intent is signaled to the docking host by the landing on the docking host; and terminating the dock between the dockee and the docking environment responsive to an expiration of an inactivity timer indicating inactivity of a communication interface for communicating with the dockee.

17. The method of claim 16, further comprising:
maintaining the docking with the docking environment while being removed from the wireless charger.

18. A method operable at a dockee for docking with a docking environment managed by a docking host, the method comprising:
landing on a wireless charger to establish a coupling with the wireless charger utilizing a wireless charging interface at the dockee;
transmitting credential information to the docking host in response to the landing on the wireless charger, over a wireless docking host interface at the dockee;
docking with the docking environment in accordance with the credential information, wherein the docking environment comprises the wireless charger as a peripheral; and
terminating the dock between the dockee and the docking environment responsive to an expiration of an inactivity timer indicating inactivity of a communication interface for communicating with the dockee.

19. The method of claim 18, wherein the wireless docking host interface comprises at least one of a Bluetooth Low Energy (BTLE) communication interface or a wireless fidelity (Wi-Fi) communication interface.

20. The method of claim 18, further comprising:
establishing a first docking session with the docking host, prior to the landing on the wireless charger;
storing the credential information at the dockee in accordance with the first docking session; and
terminating the first docking session prior to the landing on the wireless charger.

21. A method operable at a docking host for enabling a peripheral comprising a wireless charger to wirelessly charge a dockee, the method comprising:
establishing a docking session with the dockee utilizing a wireless dockee interface at the docking host;
receiving information from the wireless charger indicating that the dockee landed on the wireless charger;
transmitting an authorization to the wireless charger indicating that a wireless charging function is authorized; and
terminating the docking session with the dockee responsive to an expiration of an inactivity timer indicating inactivity of a communication interface for communicating with the dockee.

22. The method of claim 21, wherein the wireless dockee interface is configured for wireless fidelity (Wi-Fi) communication.

23. A method operable at a wireless charger for wirelessly charging a mobile device, the method comprising:
pairing with a docking host, such that the wireless charger is a peripheral in a docking environment managed by the docking host;
determining that the mobile device has landed on the wireless charger;
requesting from the docking host authorization to wirelessly charge the mobile device;
receiving the authorization from the docking host;
enabling a wireless charging function for charging the mobile device; and
disabling the wireless charging function responsive to an expiration of an inactivity timer indicating inactivity of a communication interface for communicating with the mobile device.

24. A docking host configured for docking a dockee with a docking environment managed by the docking host, the docking host comprising:
at least one processor;
a memory communicatively coupled to the at least one processor;
wireless charging circuitry communicatively coupled to the at least one processor for wirelessly charging the dockee; and
a wireless dockee interface communicatively coupled to the at least one processor for communicating with the dockee utilizing at least one of a Bluetooth Low Energy (BTLE) protocol or a wireless fidelity (Wi-Fi) protocol,
wherein the at least one processor is configured to:
transmit credential information to the dockee responsive to a landing of the dockee on a wireless charger;
receive a request from the dockee to initiate an authentication/association operation with the dockee;
dock the dockee with the docking environment in accordance with the credential information; and
terminate the dock between the dockee and the docking environment responsive to an expiration of an inactivity timer indicating inactivity of a communication interface for communicating with the dockee.

25. The docking host of claim 24, wherein the wireless charging circuitry is configured for near-field communication, and wherein the at least one processor, being configured to transmit credential information, is further configured to utilize the wireless charging circuitry to transmit the credential information.

26. The docking host of claim 24, wherein the at least one processor is further configured to:
receive a device other than the dockee on the wireless charging circuitry while the dockee remains docked with the docking environment; and
charge the device utilizing the wireless charging circuitry without docking with the device.

27. A dockee configured for docking with a docking environment managed by a docking host, the dockee comprising:
at least one processor;
a memory communicatively coupled to the at least one processor;
wireless charging circuitry communicatively coupled to the at least one processor for wirelessly charging the dockee; and
a communication interface communicatively coupled to the at least one processor for communicating with the docking host utilizing at least one of a Bluetooth Low Energy (BTLE) protocol or a wireless fidelity (Wi-Fi) protocol,
wherein the at least one processor is configured to:
receive credential information from the docking host responsive to a landing of the dockee on a wireless charger;
transmit a request to initiate an authentication/association operation with the docking host;
dock with the docking environment in accordance with the credential information; and
terminate the dock between the dockee and the docking environment responsive to an expiration of an inactivity timer indicating inactivity of a communication interface for communicating with the dockee.

28. The dockee of claim 27, wherein the wireless charging circuitry is configured for near-field communication, and wherein the receiving credential information comprises utilizing the wireless charging interface.

29. The dockee of claim 27, wherein the at least one processor is further configured to maintain the docking with the docking environment while being removed from the wireless charger.

30. A docking host configured for docking a dockee with a docking environment managed by the docking host, the docking host comprising:
   at least one processor;
   a memory communicatively coupled to the at least one processor;
   wireless charging circuitry communicatively coupled to the at least one processor for wirelessly charging the dockee; and
   a wireless dockee interface communicatively coupled to the at least one processor for communicating with the dockee utilizing at least one of a Bluetooth Low Energy (BTLE) protocol or a wireless fidelity (Wi-Fi) protocol,
   wherein the at least one processor is configured to:
      couple the wireless charging circuitry with the dockee upon its landing on the docking host;
      determine a docking intent of the dockee corresponding to the coupling of the wireless charging circuitry with the dockee;
      dock the dockee with the docking environment in accordance with the docking intent of the dockee; and
      terminate the dock between the dockee and the docking environment responsive to an expiration of an inactivity timer indicating inactivity of a communication interface for communicating with the dockee.

31. The docking host of claim 30, wherein the at least one processor is further configured to:
   receive a device other than the dockee on the wireless charging circuitry while the dockee remains docked with the docking environment; and
   charge the device utilizing the wireless charger without docking with the device.

32. A dockee configured for docking with a docking environment managed by a docking host, the dockee comprising:
   at least one processor;
   a memory communicatively coupled to the at least one processor;
   wireless charging circuitry communicatively coupled to the at least one processor for wirelessly charging the dockee; and
   a communication interface communicatively coupled to the at least one processor for communicating with the docking host utilizing at least one of a Bluetooth Low Energy (BTLE) protocol or a wireless fidelity (Wi-Fi) protocol,
   wherein the at least one processor is configured to:
      land on the docking host, wherein the docking host comprises wireless charging circuitry;
      dock with the docking environment in accordance with a docking intent of the dockee, wherein the docking intent is signaled to the docking host by the landing on the docking host; and
      terminate the dock between the dockee and the docking environment responsive to an expiration of an inactivity timer indicating inactivity of a communication interface for communicating with the dockee.

33. The dockee of claim 32, wherein the at least one processor is further configured to maintain the docking with the docking environment while being removed from the wireless charger.

34. A dockee configured for docking with a docking environment managed by a docking host, the dockee comprising:
   at least one processor;
   a memory communicatively coupled to the at least one processor;
   wireless charging circuitry communicatively coupled to the at least one processor for wirelessly charging the dockee; and
   a communication interface communicatively coupled to the at least one processor for communicating with the docking host utilizing at least one of a Bluetooth Low Energy (BTLE) protocol or a wireless fidelity (Wi-Fi) protocol,
   wherein the at least one processor is configured to:
      land on a wireless charger to establish a coupling with the wireless charger utilizing a wireless charging interface at the dockee;
      transmit credential information to the docking host in response to the landing on the wireless charger, over a wireless docking host interface at the dockee;
      dock with the docking environment in accordance with the credential information, wherein the docking environment comprises the wireless charger as a peripheral; and
      terminate the dock between the dockee and the docking environment responsive to an expiration of an inactivity timer indicating inactivity of a communication interface for communicating with the dockee.

35. The dockee of claim 34, wherein the at least one processor is further configured to:
   establish a first docking session with the docking host, prior to the landing on the wireless charger;
   store the credential information at the memory in accordance with the first docking session; and
   terminate the first docking session prior to the landing on the wireless charger.

36. A docking host configured for enabling a peripheral comprising a wireless charger to wirelessly charge a dockee, the docking host comprising:
   at least one processor;
   a memory communicatively coupled to the at least one processor;
   a communication interface communicatively coupled to the at least one processor for communicating with the wireless charger utilizing at least one of a Bluetooth Low Energy (BTLE) protocol or a wireless fidelity (Wi-Fi) protocol,
   wherein the at least one processor is configured to:
      establish a docking session with the dockee;
      receive information from the wireless charger indicating that the dockee landed on the wireless charger;
      transmit an authorization to the wireless charger indicating that a wireless charging function is authorized; and
      terminate the docking session with the dockee responsive to an expiration of an inactivity timer indicating inactivity of a communication interface for communicating with the dockee.

37. A wireless charger configured for wirelessly charging a mobile device, the wireless charger comprising:
   at least one processor;

a memory communicatively coupled to the at least one processor;
a communication interface communicatively coupled to the at least one processor for wirelessly communicating with a docking host; and
wireless charging circuitry communicatively coupled to the at least one processor for wirelessly charging the mobile device,
wherein the at least one processor is configured to:
   pair with the docking host, such that the wireless charger is a peripheral in a docking environment managed by the docking host;
   determine that the mobile device has landed on the wireless charger;
   request from the docking host authorization to wirelessly charge the mobile device;
   receive the authorization from the docking host;
   enable a wireless charging function for charging the mobile device; and
   disabling the wireless charging function responsive to an expiration of an inactivity timer indicating inactivity of a communication interface for communicating with the mobile device.

38. A docking host configured for docking a dockee with a docking environment managed by the docking host, the docking host comprising:
   means for transmitting credential information from the docking host to the dockee responsive to a landing of the dockee on a wireless charger;
   means for receiving a request from the dockee to initiate an authentication/association operation with the dockee;
   means for docking the dockee with the docking environment in accordance with the credential information; and
   means for terminating the dock between the dockee and the docking environment responsive to an expiration of an inactivity timer indicating inactivity of a communication interface for communicating with the dockee.

39. A dockee configured for docking with a docking environment managed by a docking host, the dockee comprising:
   means for receiving credential information from the docking host responsive to a landing of the dockee on a wireless charger;
   means for transmitting a request to initiate an authentication/association operation with the docking host;
   means for docking with the docking environment in accordance with the credential information; and
   means for terminating the dock between the dockee and the docking environment responsive to an expiration of an inactivity timer indicating inactivity of a communication interface for communicating with the dockee.

40. A docking host configured for docking a dockee with a docking environment managed by the docking host, the docking host comprising:
   means for coupling wireless charging circuitry at the docking host with the dockee upon its landing on the docking host;
   means for transmitting to the wireless docking host information indicating a docking intent of the dockee;
   means for docking the dockee with the docking environment in accordance with the docking intent of the dockee; and
   means for terminating the dock between the dockee and the docking environment responsive to an expiration of an inactivity timer indicating inactivity of a communication interface for communicating with the dockee.

41. A dockee configured for docking with a docking environment managed by a docking host, the dockee comprising:
   means for landing on the docking host, wherein the docking host comprises wireless charging circuitry;
   means for docking with the docking environment in accordance with a docking intent of the dockee, wherein the docking intent is signaled to the docking host by the landing on the docking host; and
   means for terminating the dock between the dockee and the docking environment responsive to an expiration of an inactivity timer indicating inactivity of a communication interface for communicating with the dockee.

42. A dockee configured for docking with a docking environment managed by a docking host, the dockee comprising:
   means for landing on a wireless charger to establish a coupling with the wireless charger utilizing a wireless charging interface at the dockee;
   means for transmitting credential information to the docking host in response to the landing on the wireless charger, over a wireless docking host interface at the dockee;
   means for docking with the docking environment in accordance with the credential information, wherein the docking environment comprises the wireless charger as a peripheral; and
   means for terminating the dock between the dockee and the docking environment responsive to an expiration of an inactivity timer indicating inactivity of a communication interface for communicating with the dockee.

43. A docking host configured for enabling a peripheral comprising a wireless charger to wirelessly charge a dockee, the docking host comprising:
   means for establishing a docking session with the dockee utilizing a wireless dockee interface at the docking host;
   means for receiving information from the wireless charger indicating that the dockee landed on the wireless charger;
   means for transmitting an authorization to the wireless charger indicating that a wireless charging function is authorized; and
   means for terminating the docking session with the dockee responsive to an expiration of an inactivity timer indicating inactivity of a communication interface for communicating with the dockee.

44. A wireless charger configured for wirelessly charging a mobile device, the wireless charger comprising:
   means for pairing with a docking host, such that the wireless charger is a peripheral in a docking environment managed by the docking host;
   means for determining that the mobile device has landed on the wireless charger;
   means for requesting from the docking host authorization to wirelessly charge the mobile device;
   means for receiving the authorization from the docking host;
   means for enabling a wireless charging function for charging the mobile device; and
   means for disabling the wireless charging function responsive to an expiration of an inactivity timer indicating inactivity of a communication interface for communicating with the mobile device.

45. A computer-readable storage medium operable at a docking host configured for docking a dockee with a docking environment managed by the docking host, comprising: instructions for causing a computer to transmit credential information from the docking host to the dockee responsive to a landing of the dockee on a wireless charger; instructions for causing a computer to receive a request from the dockee to initiate an authentication/association operation with the dockee; and instructions for causing a computer to dock the dockee with the docking environment in accordance with the credential information.

46. A non-transitory computer-readable storage medium operable at a dockee configured for docking with a docking environment managed by a docking host, comprising: instructions for causing a computer to receive credential information from the docking host responsive to a landing of the dockee on a wireless charger; instructions for causing the computer to transmit a request to initiate an authentication/association operation with the docking host; and instructions for causing a computer to dock with the docking environment in accordance with the credential information.

47. A non-transitory computer-readable storage medium operable at a docking host configured for docking a dockee with a docking environment managed by the docking host, comprising: instructions for causing a computer to couple wireless charging circuitry at the docking host with the dockee upon its landing on the docking host; instructions for causing a computer to transmit to the wireless docking host information indicating a docking intent of the dockee; and instructions for causing a computer to dock the dockee with the docking environment in accordance with the docking intent of the dockee.

48. A non-trasitory computer-readable storage medium operable at a dockee configured for docking with a docking environment managed by a docking host, comprising: instructions for causing a computer to dock with the docking environment in accordance with a docking intent of the dockee, wherein the docking intent is signaled to the docking host by the dockee landing on the docking host.

49. A non-transitory computer-readable storage medium operable at a dockee configured for docking with a docking environment managed by a docking host, comprising:
instructions for causing a computer to land on a wireless charger to establish a coupling with the wireless charger utilizing a wireless charging interface at the dockee; instructions for causing a computer to transmit credential information to the docking host in response to the landing on the wireless charger, over a wireless docking host interface at the dockee; and instructions for causing the computer to dock with the docking environment in accordance with the credential information, wherein the docking environment comprises the wireless charger as a peripheral.

50. A non-transitory computer-readable storage medium operable at a docking host configured for enabling a peripheral comprising a wireless charger to wirelessly charge a dockee, comprising: instructions for causing a computer to establish a docking session with the dockee utilizing a wireless dockee interface at the docking host; instructions for causing a computer to receive information from the wireless charger indicating that the dockee landed on the wireless charger; and instructions for causing a computer to transmit an authorization to the wireless charger indicating that a wireless charging function is authorized.

51. A non-transitory computer-readable storage medium operable at a wireless charger configured for wirelessly charging a mobile device, comprising: instructions for causing a computer to pair with a docking host, such that the wireless charger is a peripheral in a docking environment managed by the docking host; instructions for causing a computer to determine that the mobile device has landed on the wireless charger; instructions for causing a computer to request from the docking host authorization to wirelessly charge the mobile device; instructions for causing a computer to receive the authorization from the docking host; and instructions for causing the computer to enable a wireless charging function for charging the mobile device.

* * * * *